(12) United States Patent
Sugiura et al.

(10) Patent No.: US 8,916,293 B2
(45) Date of Patent: *Dec. 23, 2014

(54) PLATE-LIKE PARTICLE FOR CATHODE ACTIVE MATERIAL FOR LITHIUM SECONDARY BATTERY, CATHODE ACTIVE MATERIAL FILM FOR LITHIUM SECONDARY BATTERY, METHODS FOR MANUFACTURING THE PARTICLE AND FILM, METHOD FOR MANUFACTURING CATHODE ACTIVE MATERIAL FOR LITHIUM SECONDARY BATTERY, AND LITHIUM SECONDARY BATTERY

(75) Inventors: Ryuta Sugiura, Nagoya (JP); Nobuyuki Kobayashi, Nagoya (JP); Shohei Yokoyama, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1097 days.

This patent is subject to a terminal disclaimer.

(21) Appl. No.: 12/644,337

(22) Filed: Dec. 22, 2009

(65) Prior Publication Data

US 2010/0159332 A1 Jun. 24, 2010

Related U.S. Application Data

(60) Provisional application No. 61/236,581, filed on Aug. 25, 2009, provisional application No. 61/251,775, filed on Oct. 15, 2009.

(30) Foreign Application Priority Data

| Dec. 24, 2008 | (JP) | 2008-326997 |
| Mar. 17, 2009 | (JP) | 2009-064862 |
| Jun. 10, 2009 | (JP) | 2009-138984 |
| Aug. 21, 2009 | (JP) | 2009-191670 |
| Oct. 9, 2009 | (JP) | 2009-234951 |

(51) Int. Cl.
H01M 4/13 (2010.01)
H01M 4/58 (2010.01)
(Continued)

(52) U.S. Cl.
CPC ............ *C01G 45/1228* (2013.01); *C01G 51/42* (2013.01); *C01P 2006/12* (2013.01); *C01G* (Continued)

(58) Field of Classification Search
USPC ........................................ 429/291.1, 224, 223
See application file for complete search history.

(56) References Cited

U.S. PATENT DOCUMENTS 5,503,930 A 4/1996 Maruyama et al.
5,683,672 A * 11/1997 Sekai .......................... 423/594.3
(Continued)

FOREIGN PATENT DOCUMENTS

CN 1284756 2/2001
CN 1284756 A * 2/2001
(Continued)

OTHER PUBLICATIONS

U.S. Appl. No. 12/644,356, filed Dec. 22, 2009, Sugiura et al.
(Continued)

*Primary Examiner* — Roy King
*Assistant Examiner* — Jenny Wu
(74) *Attorney, Agent, or Firm* — Burr & Brown, PLLC

(57) ABSTRACT

An object of the present invention is to provide a lithium secondary battery which has improved capacity, durability, and rate characteristic as compared with conventional lithium secondary batteries. A plate-like particle or a film for a lithium secondary battery cathode active material has a layered rock salt structure. The (003) plane is oriented in a direction intersecting the direction of the plate surface of the particle or film.

17 Claims, 9 Drawing Sheets

(51) Int. Cl.
| | |
|---|---|
| *C01G 51/00* | (2006.01) |
| *C01G 53/00* | (2006.01) |
| *H01M 4/131* | (2010.01) |
| *H01M 4/04* | (2006.01) |
| *C01G 45/12* | (2006.01) |
| *H01M 4/525* | (2010.01) |
| *H01M 4/1391* | (2010.01) |
| *H01M 4/505* | (2010.01) |
| *H01M 4/02* | (2006.01) |
| *H01M 10/0525* | (2010.01) |

(52) U.S. Cl.
CPC ..... 53/50 (2013.01); *C01P 2002/74* (2013.01); *H01M 2004/021* (2013.01); *C01P 2006/40* (2013.01); *Y02E 60/122* (2013.01); *H01M 4/131* (2013.01); *H01M 4/0471* (2013.01); *C01P 2004/03* (2013.01); *H01M 4/525* (2013.01); *C01P 2004/20* (2013.01); *H01M 10/0525* (2013.01); *H01M 4/1391* (2013.01); *H01M 4/505* (2013.01); *C01G 51/50* (2013.01)
USPC .................................................... 429/231.8

(56) References Cited

U.S. PATENT DOCUMENTS

| | | | |
|---|---|---|---|
| 2005/0014065 | A1 | 1/2005 | Jung et al. |
| 2005/0142442 | A1 | 6/2005 | Yuasa et al. |
| 2005/0142444 | A1 | 6/2005 | Nagashima |
| 2006/0035151 | A1* | 2/2006 | Kumeuchi et al. ......... 429/231.1 |
| 2006/0216600 | A1 | 9/2006 | Inagaki et al. |
| 2007/0072086 | A1 | 3/2007 | Nakagawa |
| 2008/0268347 | A1 | 10/2008 | Ohzuku et al. |

FOREIGN PATENT DOCUMENTS

| | | | |
|---|---|---|---|
| CN | 1741302 | A | 3/2006 |
| CN | 1934728 | | 3/2007 |
| EP | 0 672 622 | | 9/1995 |
| EP | 1 972 604 | | 9/2008 |
| EP | 2 071 650 | A1 | 6/2009 |
| EP | 1 825 545 | B1 | 11/2009 |
| JP | 03-272564 | A1 | 12/1991 |
| JP | 08-055624 | A1 | 2/1996 |
| JP | 2000-200624 | | 7/2000 |
| JP | 2000-260479 | A1 | 9/2000 |
| JP | 2000-294242 | A1 | 10/2000 |
| JP | 2001-006671 | | 1/2001 |
| JP | 2001-052703 | A1 | 2/2001 |
| JP | 2001-297761 | A1 | 10/2001 |
| JP | 2001-351687 | A1 | 12/2001 |
| JP | 2002-279985 | A1 | 9/2002 |
| JP | 2002-324544 | A1 | 11/2002 |
| JP | 2003-002653 | | 1/2003 |
| JP | 2003-132887 | A1 | 5/2003 |
| JP | 2004-311427 | A1 | 11/2004 |
| JP | 2005-053764 | | 3/2005 |
| JP | 2005-197004 | A1 | 7/2005 |
| JP | 2006-012576 | A1 | 1/2006 |
| JP | 2006-210007 | A1 | 8/2006 |
| JP | 2007-087909 | A1 | 4/2007 |
| JP | 2007-179917 | A1 | 7/2007 |
| JP | 2007-214118 | A1 | 8/2007 |
| JP | 2008-523567 | A1 | 3/2008 |
| JP | 2008-124038 | | 5/2008 |
| JP | 2008-258160 | A1 | 10/2008 |
| JP | 2009-295514 | A1 | 12/2009 |
| JP | 2009-301850 | A1 | 12/2009 |
| WO | 01/20696 | | 3/2001 |
| WO | 03/088382 | A1 | 10/2003 |
| WO | 2004/102700 | A1 | 11/2004 |

OTHER PUBLICATIONS

U.S. Appl. No. 12/644,369, filed Dec. 22, 2009, Sugiura et al.
U.S. Appl. No. 12/644,381, filed Dec. 22, 2009, Sugiura et al.
U.S. Appl. No. 12/644,394, filed Dec. 22, 2009, Sugiura et al.
U.S. Appl. No. 12/644,405, filed Dec. 22, 2009, Sugiura et al.
U.S. Appl. No. 12/644,423, filed Dec. 22, 2009, Sugiura et al.
Jian Xie, et al., "*Orientation Dependence of Li-Ion Diffusion Kinetics in LiCoO$_2$ Thin Films Prepared by RF Magnetron Sputtering*," Solid State Ionics, Science Direct, vol. 179, May 15, 2008, pp. 362-370.
P.J. Bouwman, et al., "*Influence of Diffusion Plane Orientation on Electrochemical Properties of Thin Film LiCoO$_2$ Electrodes*," Journal of the Electrochemical Society, vol. 149(6), Apr. 12, 2002, pp. A699-A709.
Chinese Office Action dated Apr. 26, 2013 (with English translation) for CN 200980149111.6.
Chinese Office Action mailed Jan. 25, 2013 (with partial English translation).
Xie., J. et. al., "*Kinetics Investigation of preferential (104) Plane Oriented LiCoO$_2$ Thin Film Prepared by RF Magnetron Sputtering*," ScienceDirect, vol. 178, No. 19-20, Aug. 7, 2007, pp. 1218-1224 (7 pages).
Guilmard, M., "*Structural and Electrochemical Properties of LiNi$_{0.70}$Co$_{0.15}$Al$_{0.15}$O$_2$*," ScienceDirect, vol. 160, no. 1-2, May 1, 2003, pp. 39-50 (12 pp.).
European Search Report, European Patent Application No. 09835094.5, dated Oct. 22, 2013 (10 pages).
European Search Report, European Patent Application No. 09835103.4, dated Oct. 22, 2013 (8 pages).
European Search Report, European Patent Application No. 09835088.7, dated Oct. 22, 2013 (8 pages).
Chinese Search Report, With English Translation, Chinese Patent Application No. 200980149111.6, dated Oct. 30, 2013 (27 pages).

\* cited by examiner

PLATE-LIKE PARTICLE FOR CATHODE ACTIVE MATERIAL FOR LITHIUM SECONDARY BATTERY, CATHODE ACTIVE MATERIAL FILM FOR LITHIUM SECONDARY BATTERY, METHODS FOR MANUFACTURING THE PARTICLE AND FILM, METHOD FOR MANUFACTURING CATHODE ACTIVE MATERIAL FOR LITHIUM SECONDARY BATTERY, AND LITHIUM SECONDARY BATTERY

FIELD OF THE INVENTION

The present invention relates to a cathode active material having a layered rock salt structure for a lithium secondary battery and a method for manufacturing the same, and more particularly, to a plate-like particle for the cathode active material, a cathode active material film, and a method for manufacturing the cathode active material.

BACKGROUND OF THE INVENTION

A cobalt-based cathode active material is widely used as a material for producing a positive electrode of a lithium secondary battery (may be referred to as a lithium ion secondary cell). The cobalt-based cathode active material (typically, $LiCoO_2$) has a so-called $\alpha$-$NaFeO_2$ type layered rock salt structure. In the cobalt-based cathode active material, intercalation and deintercalation of lithium ions ($Li^+$) occur through a crystal plane other than the (003) plane (e.g., the (101) plane or the (104) plane). Through such intercalation and deintercalation of lithium ions, charge and discharge are carried out.

SUMMARY OF THE INVENTION

A cathode active material of this kind for a cell brings about improvement in cell capacity by means of exposure of the crystal plane through which lithium ions are favorably intercalated and deintercalated (the plane other than the (003) plane; for example, the (101) plane or the (104) plane) as much extent as possible to an electrolyte. Demand exists not only for merely improving capacity, but also for improving as many characteristics as possible, such as durability and rate characteristic. The present invention has been conceived to solve such a problem. That is, an object of the present invention is to provide a lithium secondary battery which has improved capacity, durability, and rate characteristic as compared with a conventional lithium secondary battery.

In one aspect of the present invention, a plate-like particle for a lithium secondary battery cathode active material, the particle having a layered rock salt structure, is characterized in that the (003) plane in the layered rock salt structure is oriented in a direction intersecting the direction of the plate surface of the particle. That is, the particle is formed such that a plane other than the (003) plane (e.g., the (104) plane) is oriented in the direction of the plate surface. The particle can be formed to a thickness of preferably 20 μm or less.

The lithium secondary battery of the present invention includes a positive electrode which contains, as a cathode active material, the plate-like particles for cathode active material of the present invention; a negative electrode which contains, as an anode active material, a carbonaceous material or a lithium-occluding material; and an electrolyte provided so as to intervene between the positive electrode and the negative electrode.

In formation of a positive electrode of a lithium secondary battery, for example, the plate-like particles for cathode active material are dispersed in a binder so as to form a cathode active material layer. A laminate of the cathode active material layer and a predetermined cathode collector serves as the positive electrode. That is, in this case, the positive electrode is formed by stacking the cathode active material layer, which contains the plate-like particles, on the cathode collector.

In another aspect of the present invention, a cathode active material film for a lithium secondary battery, the film having the above-mentioned structure, is characterized in that a plane other than the (003) plane (e.g., the (104) plane) in the structure is oriented in the direction of the plate surface of the film. The film may be formed to a thickness of preferably 20 μm or less.

The lithium secondary battery of the present invention includes a positive electrode which includes the cathode active material film of the present invention; a negative electrode which contains a carbonaceous material or a lithium-occluding material as an anode active material; and an electrolyte provided so as to intervene between the positive electrode and the negative electrode.

In formation of the positive electrode of a lithium secondary battery, for example, a laminate of the cathode active material film and a predetermined cathode collector (for example, a laminate formed by laminating the cathode active material film and an electric conductor film together through vapor deposition (e.g., sputtering), application, or the like) serves as the positive electrode.

Regarding the degree of orientation, preferably, the ratio of intensity of diffraction by the (003) plane to intensity of diffraction by the (104) plane, [003]/[104], as obtained by X-ray diffraction falls within a range of 0.005 to 1.0.

When the ratio [003]/[104] is 1.0 or less, the deintercalation of Li ions is facilitated, resulting in a remarkable improvement in charge-discharge characteristics. However, when the ratio [003]/[104] is less than 0.005, the cycle characteristic deteriorates. Conceivably, this is because, when the degree of orientation is excessively high (i.e., crystals are oriented to an excessively high degree), a change in the volume of crystal associated with intercalation and deintercalation of Li ions causes the particles and the film to be apt to break (the specifics of the reason for the deterioration in cycle characteristic are not clear).

The above-mentioned particles and film can be manufactured by a method which includes the following steps (1) and (2): (1) a step of forming a thin film-like sheet (self-standing film: the definition thereof will be described later) which contains plate-like $Co_3O_4$ particles (h00)-oriented to the direction of the plate surface of a particle, and (2) a step of introducing Li into the $Co_3O_4$ particles.

The step (1) can include the following steps: a step of forming a green sheet having a thickness of 20 μm or less which contains $Co_3O_4$ and $Bi_2O_3$, and a step of sintering the green sheet at a temperature falling within a range of 900° C. to 1,300° C.

The following step (3) can further be included between the above-mentioned steps (1) and (2): (3) a step of crushing the sheet into a large number of the $Co_3O_4$ particles.

When the step (3) is included, the step (2) can include the following step: a step of mixing the $Co_3O_4$ particles yielded by the crushing step and $Li_2CO_3$, and heating the resultant mixture.

According to the present invention, in the plate-like particles and film which have the above-mentioned structure, a plane through which lithium ions are favorably intercalated and deintercalated (a plane other than the (003) plane; e.g., the (104) plane) is oriented in the direction of the plate surface. Thus, the exposure (contact) of the plane to an electrolyte increases to a greater extent, and the percentage of exposure of the (003) plane at the surface of the particles and film greatly lowers.

Thus, for example, in the case of the film to be used as material for a positive electrode of a solid-type lithium secondary battery, high capacity and high rate characteristic can be attained simultaneously. Alternatively, in the case of the plate-like particles to be used as material for a positive electrode of a liquid-type lithium secondary battery, even when the particle size is increased for improving durability and attaining high capacity, high rate characteristic can be maintained.

As mentioned above, the present invention can provide a lithium secondary battery whose capacity, durability, and rate characteristic are improved as compared with those of a conventional lithium secondary battery.

DETAILED DESCRIPTION OF THE INVENTION

Preferred embodiments of the present invention will next be described by use of examples and comparative examples. The following description of the embodiments is nothing more than the specific description of mere example embodiments of the present invention to the possible extent in order to fulfill description requirements (descriptive requirement and enabling requirement) of specifications required by law. Thus, as will be described later, naturally, the present invention is not limited to the specific configurations of embodiments and examples to be described below. Modifications that can be made to the embodiments and examples are collectively described herein at the end, since insertion thereof into the description of the embodiments would disturb understanding of consistent description of the embodiments.

<Configuration of Lithium Secondary Battery>

Figure 1A:
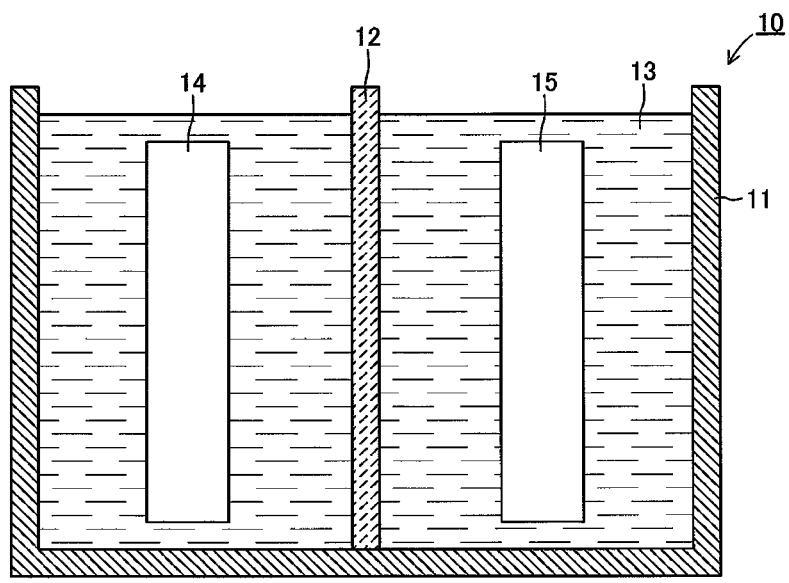
FIG. 1A is a sectional view of the schematic configuration of a lithium secondary battery according to an embodiment of the present invention.

FIG. 1A is a sectional view of the schematic configuration of a lithium secondary battery 10 according to an embodiment of the present invention.

Referring to FIG. 1A, the lithium secondary battery 10 of the present embodiment is of a so-called liquid type and includes a cell casing 11, a separator 12, an electrolyte 13, a negative electrode 14, and a positive electrode 15.

The separator 12 is provided so as to halve the interior of the cell casing 11. The cell casing 11 accommodates the liquid electrolyte 13. The negative electrode 14 and the positive electrode 15 are provided within the cell casing 11 in such a manner as to face each other with the separator 12 located therebetween.

For example, a nonaqueous-solvent-based electrolytic solution prepared by dissolving an electrolyte salt, such as a lithium salt, in a nonaqueous solvent, such as an organic solvent, is preferably used as the electrolyte 13, in view of electrical characteristics and easy handleability. However, a polymer electrolyte, a gel electrolyte, an organic solid electrolyte, or an inorganic solid electrolyte can also be used as the electrolyte 13 without problems.

No particular limitation is imposed on a solvent for a nonaqueous electrolytic solution. Examples of the solvent include chain esters, such as dimethyl carbonate, diethyl carbonate, ethyl methyl carbonate, and methyl propione carbonate; cyclic esters having high dielectric constant, such as ethylene carbonate, propylene carbonate, butylene carbonate, and vinylene carbonate; and mixed solvents of a chain ester and a cyclic ester. A mixed solvent containing a chain ester serving as a main solvent with a cyclic ester is particularly suitable.

In preparation of a nonaqueous electrolytic solution, examples of an electrolyte salt to be dissolved in the above-mentioned solvent include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(RfSO_2)(Rf'SO_2)$, $LiC(RfSO_2)_3$, $LiC_nF_{2n+1}SO_3 (n≥2)$, and $LiN(RfOSO_2)_2$ [Rf and Rf' are fluoroalkyl groups]. They may be used singly or in combination of two or more species. Among the above-mentioned electrolyte salts, a fluorine-containing organic lithium salt having a carbon number of 2 or greater is particularly preferred. This is because the fluorine-containing organic lithium salt is high in anionic property and readily undergoes ionization, and is thus readily dissolvable in the above-mentioned solvent. No particular limitation is imposed on the concentration of electrolyte salt in a nonaqueous electrolytic solution. However, for example, the concentration is preferably 0.3 mol/L to 1.7 mol/L, more preferably 0.4 mol/L to 1.5 mol/L.

Any anode active material may be used for the negative electrode 14, so long as the material can occlude and release lithium ions. For example, there are used carbonaceous materials, such as graphite, pyrolytic carbon, coke, glassy carbon, a sintered body of organic high polymer compound, mesocarbon microbeads, carbon fiber, and activated carbon. Also, metallic lithium or a lithium-occluding material such as an alloy which contains silicon, tin, indium, or the like; an oxide of silicon, tin, or the like which can perform charge and discharge at low electric potential near that at which lithium does; a nitride of lithium and cobalt such as $Li_{2.6}Co_{0.4}N$ can be used as the anode active material. Further, a portion of graphite can be replaced with a metal which can be alloyed with lithium, or with an oxide. When graphite is used as the anode active material, voltage at full charge can be considered to be about 0.1 V (vs. lithium); thus, the electric potential of the positive electrode 15 can be conveniently calculated as a cell voltage plus 0.1 V. Therefore, since the electric potential of charge of the positive electrode 15 is readily controlled, graphite is preferred.

Figure 1B:
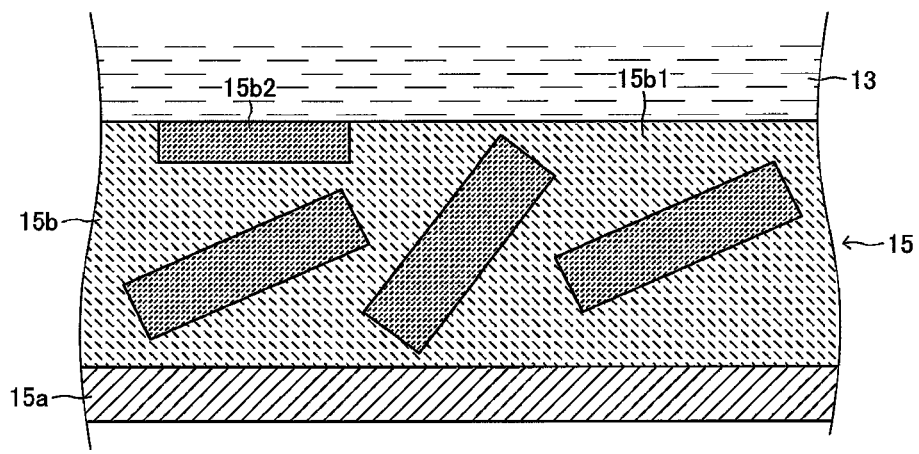
FIG. 1B is an enlarged sectional view of a positive electrode shown in FIG. 1A.

FIG. 1B is an enlarged sectional view of the positive electrode 15 shown in FIG. 1A. Referring to FIG. 1B, the positive electrode 15 includes a cathode collector 15a and a cathode active material layer 15b. The cathode active material layer 15b is composed of a binder 15b1 and plate-like particles 15b2 for cathode active material.

Since the basic configurations of the lithium secondary battery 10 and the positive electrode 15 (including materials used to form the cell casing 11, the separator 12, the electrolyte 13, the negative electrode 14, the cathode collector 15a, and the binder 15b1) shown in FIGS. 1A and 1B are well known, detailed description thereof is omitted herein.

The plate-like particle 15b2 for cathode active material according to an embodiment of the present invention is a particle which contains cobalt and lithium and has a layered rock salt structure; more particularly, a $LiCoO_2$ particle, and is formed into a plate-like form having a thickness of about 2 μm to 100 μm.

Figure 2A:
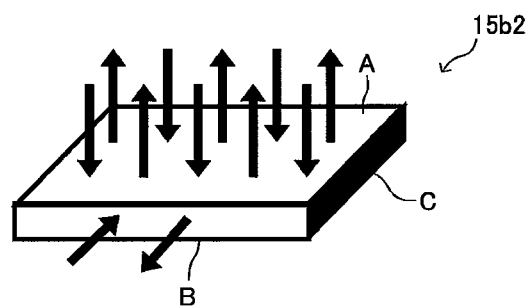
FIG. 2A is an enlarged perspective view of a plate-like particle for cathode active material shown in FIG. 1.
Figure 2B:
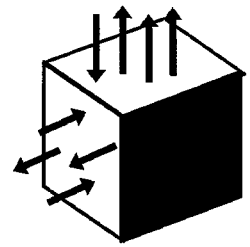
FIG. 2B is an enlarged perspective view of a cathode active material particle of a comparative example.
Figure 2C:
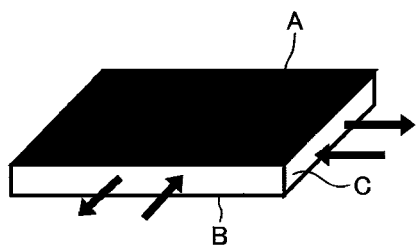
FIG. 2C is an enlarged perspective view of a cathode active material particle of a comparative example. cathode active material shown in FIG. 2A.

FIG. 2A is an enlarged perspective view of the plate-like particle 15b2 for cathode active material shown in FIG. 1. FIGS. 2B and 2C are enlarged perspective views of cathode active material particles of comparative examples.

As shown in FIG. 2A, the plate-like particle 15b2 for cathode active material is formed such that a plane other than the (003) plane (e.g., the (101) plane or the (104) plane) is exposed at both surfaces (upper surface (plate surface) A and lower surface (plate surface) B) in the thickness direction of the particle and the (003) plane (colored black in the drawing) is exposed at the end surfaces C, which intersects the plate surface direction of the particle. That is, the plate-like particle 15b2 for cathode active material is formed such that the plane other than the (003) plane (e.g., the (104) plane) is oriented in the direction of the plate surface of the particle.

By contrast, the particle of a comparative example shown in FIG. 2B is formed into an isotropic shape rather than a thin plate. The particle of a comparative example shown in FIG. 2C is in the form of a thin plate, but is formed such that the (003) planes are exposed at both surfaces (upper surfaces A and lower surface B) located in the thickness direction of the particle. The particles of these comparative examples are manufactured by conventional manufacturing methods.

<Outline of Method for Manufacturing Plate-Like Particles for Cathode Active Material>

The plate-like particles 15b2 for cathode active material shown in FIG. 2A are readily and reliably manufactured by the following manufacturing method.

1. Preparation of Material Particles

For synthesizing a cathode active material $LiMO_2$ having a layered rock salt structure, particles of compounds of Li, Co, Ni, Mn, etc. are appropriately used as particle-form starting materials. Alternatively, a particle-form starting material having a composition of $LiMO_2$ (synthesized particles) may also be used.

Alternatively, there may be used particles prepared by mixing particles of compounds of Co, Ni, Mn, etc., excluding Li compound, or particles having a composition of $(Co,Ni,Mn)O_x$. In this case, after a step of sintering a compact, the sintered compact and a Li compound are reacted with each other, thereby yielding $LiMO_2$ (details will be described hereinbelow).

For the purpose of accelerating grain growth or compensating volatilization during sintering, a Li compound may be added in an excess amount of 0.5 mol % to 30 mol %. Alternatively, for the purpose of accelerating grain growth, a low-melting-point oxide, such as bismuth oxide, or low-melting-point glass, such as borosilicate glass, may be added in an amount of 0.001 wt % to 30 wt %.

2. Forming Step for Material Particles

Material particles are formed into a sheet-like self-standing compact having a thickness of 100 μm or less. "Self-standing" in "self-standing compact" is synonymous with "independent" in "independent sheet" to be mentioned later. Specifically, the "self-standing compact" is typically a compact which can maintain the form of a sheet-like compact by itself. The "self-standing compact" also encompasses a compact which is formed by affixing or film-forming material particles on a substrate and then separating the resultant compact from the substrate before or after sintering, even though the compact fails to maintain the form of a sheet-like compact by itself.

An employable method for forming a compact is, for example, a doctor blade process using a slurry which contains material particles. Alternatively, a drum drier can be used for formation of a compact; specifically, slurry which contains material is applied onto a heated drum, and then the dried material is scraped off with a scraper. A disk drier can also be used; specifically, slurry is applied onto a heated disk surface, and then the dried material is scraped off with a scraper. Also, hollow granular bodies obtained by appropriately setting conditions of a spray drier can be considered a sheet-like compact having curvature and thus can be preferably used as a compact. Further, an extruding process using a body which contains material particles can be used as a forming method for a compact.

When the doctor blade process is employed, the procedure may be as follows: slurry is applied onto a flexible plate (e.g., an organic polymer plate, such as a PET film); the applied slurry is dried and solidified into a compact; and the compact is separated from the plate, thereby yielding a green compact of plate-like polycrystalline particles. Slurry and body before forming may be prepared as follows: inorganic particles are dispersed in an appropriate dispersion medium, and, then binder and plasticizer are added as appropriate. Preferably, slurry is prepared so as to have a viscosity of 500 cP to 4,000 cP and is deformed under reduced pressure.

The thickness of a compact is preferably 50 μM or less, more preferably 20 μm or less. Preferably, the thickness of the compact is 2 μm or greater. When the thickness is 2 μm or greater, a self-standing sheet-like compact can be readily formed. Since the thickness of the sheet-like compact is substantially equal to the thickness of a plate-like particle, the thickness of the sheet-like compact is set as appropriate according to applications of the plate-like particles.

3. Step of Sintering a Compact

In the sintering step, a compact yielded in the forming step is placed on a setter, for example, as is (in a sheet state), followed by sintering. Alternatively, the sintering step may be performed as follows: the sheet-like compact is cut up or fragmentized as appropriate, and the resultant pieces are placed in a sheath, followed by sintering.

When material particles are unsynthesized mixed particles, in the sintering step, synthesis, sintering, and grain growth occur. In the present invention, since the compact assumes the form of a sheet having a thickness of 100 μm or less, grain growth in the thickness direction is limited. Thus, after grain growth progresses in the thickness direction of the compact until a single crystal grain is completed, grain growth progresses only in in-plane directions of the compact. At this time, particular crystal face which is energetically stable spreads in the sheet surface (plate surface). Thus, there is yielded a thin film-like sheet (self-standing film) in which particular crystal face is oriented in parallel with the sheet surface (plate surface).

When material particles are of $LiMO_2$, the (101) and (104) planes, which are crystal faces through which lithium ions are favorably intercalated and deintercalated, can be oriented so as to be exposed at the sheet surface (plate surface). When material particles do not contain Li (e.g., material particles are of $M_3O_4$ having a spinel structure), the (h00) planes, which will become the (104) planes when reacting with a Li compound to thereby yield $LiMO_2$, can be oriented so as to be exposed at the sheet surface (plate surface).

Preferably, the sintering temperature is 800° C. to 1,350° C. When the temperature is lower than 800° C., grain growth becomes insufficient; thus, the degree of orientation becomes low. When the temperature is in excess of 1,350° C., decomposition and volatilization progress. Preferably, the sintering time falls within a range of 1 hour to 50 hours. When the time is shorter than one hour, the degree of orientation becomes low. When the time is longer than 50 hours, energy consumption becomes excessively large. The atmosphere of sintering is set as appropriate such that decomposition during sintering does not progress. In the case where volatilization of Li progresses, preferably, a lithium atmosphere is established through disposition of lithium carbonate or the like within the same sheath. In the case where release of oxygen and reduction progress during sintering, preferably, sintering is carried out in an atmosphere having high partial pressure of oxygen.

4. Crushing Step and Lithium Introduction Step

Plate-like particles are yielded as follows: the sintered sheet-like compact is placed on a mesh having a predetermined mesh size, and then a spatula is pressed against the sheet from above, whereby the sheet is crushed into a large number of plate-like particles. The crushing step may be performed after the lithium introduction step.

In the case where a sheet is formed from starting material particles which do not contain a Li compound, and is then sintered for orientation, or plate-like particles are yielded through crushing of the sheet, the sheet or the plate-like particles are reacted with a Li compound (lithium nitrate, lithium carbonate, etc.), thereby yielding a cathode active material film in which a crystal face of good intercalation and deintercalation of lithium ions is oriented so as to be exposed at the plate surface. For example, lithium is introduced by sprinkling lithium nitrate over the oriented sheet or particles such that the mole ratio between Li and M, Li/M, is 1 or higher, followed by heat treatment. Preferably, the heat treatment temperature is 600° C. to 800° C. When the temperature is lower than 600° C., the reaction does not progress sufficiently. When the temperature is higher than 800° C., orientation deteriorates.

Next, the outline of a typical method for manufacturing $LiCoO_2$ particles will be described.

<<Sheet Formation Step>>

A green sheet which contains $Co_3O_4$ and $Bi_2O_3$ and has a thickness of 20 μm or less is formed. The green sheet is sintered at a temperature falling within a range of 900° C. to 1,300° C. for a predetermined time, thereby yielding an independent thin film-like sheet (self-standing film) which is (h00)-oriented in the plate surface direction of the particle (i.e., the (h00) planes are oriented in parallel with the plate surface (the orientation may be referred to merely as "(h00) orientation") and which is composed of a large number of plate-like $Co_3O_4$ particles. In the course of the sintering, bismuth is removed from the sheet through volatilization, and $Co_3O_4$ is phase-transformed to CoO through reduction.

The "independent" sheet (self-standing film) refers to a sheet which, after sintering, can be handled by itself independent of the other support member. That is, the "independent" sheet does not include a sheet which is fixedly attached to another support member (substrate or the like) through sintering and is thus integral with the support member (unseparable or difficult to be separated).

In the thus-formed green sheet in a thin-film (self-standing film)-like form, the amount of material present in the thickness direction is very small as compared with that in a particle plate surface direction; i.e., in an in-plane direction (a direction orthogonal to the thickness direction).

Thus, at the initial stage at which a plurality of particles are present in the thickness direction, grain growth progresses in random directions. As the material in the thickness direction is consumed with progress of grain growth, the direction of grain growth is limited to two-dimensional directions within the plane. Accordingly, grain growth in planar directions is reliably accelerated.

Particularly, by means of forming the green sheet to the smallest possible thickness (e.g., several μm or less) or accelerating grain growth to the greatest possible extent despite a relatively large thickness of about 100 μm (e.g., about 20 μm), grain growth in planar directions is more reliably accelerated.

At this time, only those particles whose crystal faces having the lowest surface energy are present within the plane of the green sheet selectively undergo in-plane flat (plate-like) grain growth. As a result, sintering the sheet yields plate-like crystal grains of CoO which have high aspect ratio and in which particular crystal faces (herein, the (h00) planes) are oriented in the direction of the plate surfaces of the grains.

In the process of temperature lowering, CoO is oxidized into $Co_3O_4$. At this time, the orientation of CoO is transferred, thereby yielding plate-like crystal grains of $Co_3O_4$ in which particular crystal faces (herein, the (h00) planes) are oriented in the direction of the plate surfaces of the grains.

In the oxidation from CoO to $Co_3O_4$, the degree of orientation is apt to deteriorate for the following reason: since CoO and $Co_3O_4$ differ greatly in crystal structure and Co—O interatomic distance, oxidation; i.e., insertion of oxygen atoms, is apt to be accompanied by a disturbance of crystal structure. Thus, preferably, conditions are selected as appropriate so as to avoid deterioration in the degree of orientation to the greatest possible extent. For example, reducing the temperature-lowering rate, holding at a predetermined temperature, and reducing the partial pressure of oxygen are preferred.

Thus, sintering such a green sheet yields a thin film (self-standing film) formed as follows: a large number of thin plate-like grains in which particular crystal faces are oriented in the direction of the plate surfaces of the grains are joined together at grain boundaries in planar directions (refer to Japanese Patent Application No. 2007-283184 filed by the applicant of the present invention). That is, there is formed a thin film (self-standing film) in which the number of crystal grains in the thickness direction is substantially one. The meaning of "the number of crystal grains in the thickness direction is substantially one" does not exclude a state in which portions (e.g., end portions) of in-plane adjacent crystal grains overlie each other in the thickness direction. The self-standing film can become a dense ceramic sheet in which a large number of thin plate-like grains as mentioned above are joined together without clearance therebetween.

<<Crushing Step>>

The thin film-like sheet (self-standing sheet) yielded in the above-mentioned sheet formation step is in such a state that the sheet is apt to break at grain boundaries. Thus, the thin film-like sheet (self-standing sheet) yielded in the above-mentioned sheet formation step is placed on a mesh having a predetermined mesh size, and then a spatula is pressed against the sheet from above, whereby the sheet is crushed into a large number of $Co_3O_4$ particles.

<<Lithium Introduction Step>>

The (h00)-oriented (the meaning of "(h00) orientation" is mentioned above) $Co_3O_4$ particles yielded in the above-mentioned crushing step and $Li_2CO_3$ are mixed. The resultant mixture is heated for a predetermined time, whereby lithium is introduced into the $Co_3O_4$ particles. Thus, there is yielded (104)-oriented $LiCoO_2$; i.e., the plate-like particles 15$b$2 for cathode active material.

In addition to lithium carbonate, there can be used as a lithium source for lithium introduction, for example, various lithium salts, such as lithium nitrate, lithium acetate, lithium chloride, lithium oxalate, and lithium citrate; and lithium alkoxides, such as lithium methoxide and lithium ethoxide.

For enhancement of orientation of $LiCoO_2$ particles, conditions in lithium introduction; specifically, Li/Co molar ratio, heating temperature, heating time, atmosphere, etc., must be set as appropriate in consideration of melting point, decomposition temperature, reactivity, etc. of a material to be used as a lithium source.

For example, when the mixture of (h00)-oriented $Co_3O_4$ particles and a lithium source react with each other in a very active state, the orientation of $Co_3O_4$ particles may be disturbed, which is undesirable. The active state means, for example, the following state: the lithium source becomes excessive in amount and becomes a liquid state, and not only are intercalated lithium ions into crystals of $Co_3O_4$ particles, but also $Co_3O_4$ particles are dissolved and re-precipitated in the liquid of the lithium source.

The crushing step may be carried out after the lithium introduction step.

SPECIFIC EXAMPLES

Next will be described in detail specific examples of the above-mentioned manufacturing method, and the results of evaluation of particles manufactured by the specific example methods.

Example 1

Manufacturing Method

A slurry was prepared by the following method: A $Co_3O_4$ powder (particle size: 1 μm to 5 μm; product of Seido Chemical Industry Co., Ltd.) was pulverized, yielding $Co_3O_4$ particles (particle size: 0.3 μm); $Bi_2O_3$ (particle size: 0.3 μm; product of Taiyo Koko Co., Ltd.) was added in an amount of 20 wt. % to the $Co_3O_4$ particles; and the resultant mixture (100 parts by weight), a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: Di(2-ethylhexyl) phthalate; product of Kurogane Kasei Co., Ltd.) (4 parts by weight), and a dispersant (product name RHEODOL SP-O30, product of Kao Corp.) (2 parts by weight) were mixed. The resultant mixture was stirred under reduced pressure for defoaming and was prepared to a viscosity of 500 cP to 700 cP. The viscosity was measured by means of an LVT-type viscometer, a product of Brookfield Co., Ltd.

The thus-prepared slurry was formed into a sheet on a PET film by the doctor blade process such that the thickness of the sheet was 2 μm as measured after drying.

A 70 mm square piece was cut out from the sheet-like compact separated from the PET film by means of a cutter; the piece was placed at the center of a setter (dimension: 90 mm square×1 mm high) made of zirconia and embossed in such a manner as to have a protrusion size of 300 μm; sintering was performed at 1,150° C. for 5 hours; temperature was lowered at a rate of 50° C./h; and a portion of the piece which was not fused to the setter was taken out.

The ceramic sheet which was yielded through sintering was placed on a mesh having an opening diameter of 100 μm, and then a spatula was lightly pressed against the ceramic sheet so as to cause the ceramic sheet to pass through the mesh, thereby crushing the ceramic sheet.

A $Co_3O_4$ powder yielded through crushing of the ceramic sheet and an, $Li_2CO_3$ powder (product of Kanto Chemical Co., Inc.) were mixed at a ratio Li/Co of 1.0. The resultant mixture was thermally treated within a crucible at 750° C. for 3 hours, thereby yielding powdery $LiCoO_2$.

<<Results of Evaluation>>

Figure 3A:
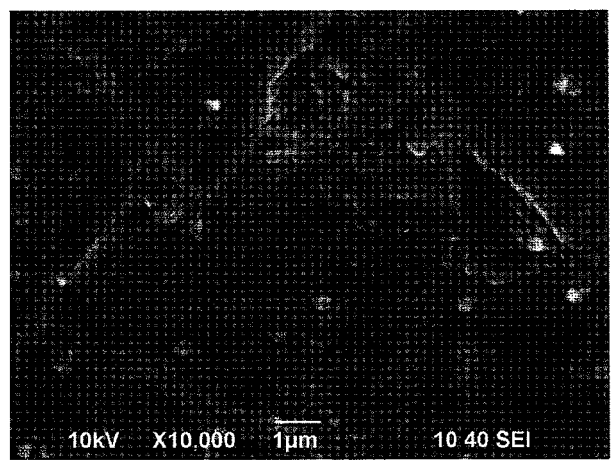
FIG. 3A is a scanning electron micrograph showing the surface of an (h00)-oriented $Co_3O_4$ particle yielded by a sheet formation step in a manufacturing method of the present invention.
Figure 3B:
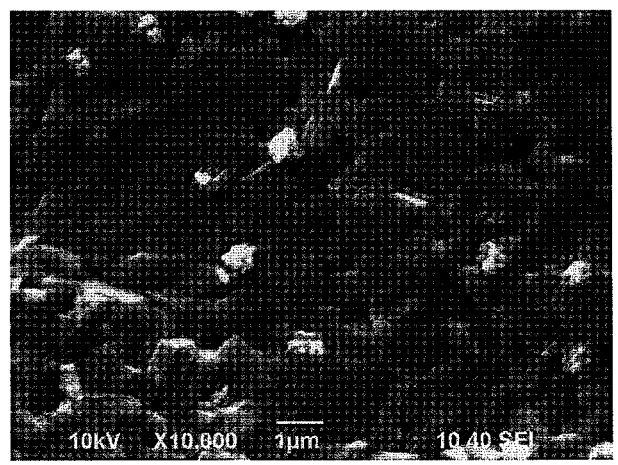
FIG. 3B is a scanning electron micrograph showing the surface of an $LiCoO_2$ particle yielded (having undergone the lithium introduction step) by the manufacturing method of the present invention.
Figure 3C:
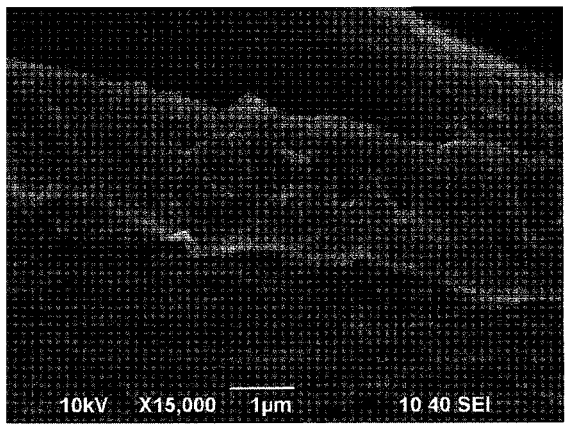
FIG. 3C is a scanning electron micrograph showing the cross section of an $LiCoO_2$ particle yielded (having undergone the lithium introduction step) by the manufacturing method of the present invention.

FIG. 3A is a scanning electron micrograph showing the surface of an (h00)-oriented $Co_3O_4$ particle yielded by the sheet formation step in the manufacturing method of the present invention (the above-mentioned specific example). FIG. 3B is a scanning electron micrograph showing the surface of an $LiCoO_2$ particle yielded (having undergone the lithium introduction step) by the manufacturing method of the present invention (the above-mentioned specific example). FIG. 3C is a scanning electron micrograph showing the cross section of an $LiCoO_2$ particle yielded (having undergone the lithium introduction step) by the manufacturing method of the present invention (the above-mentioned specific example).

Figure 4A:
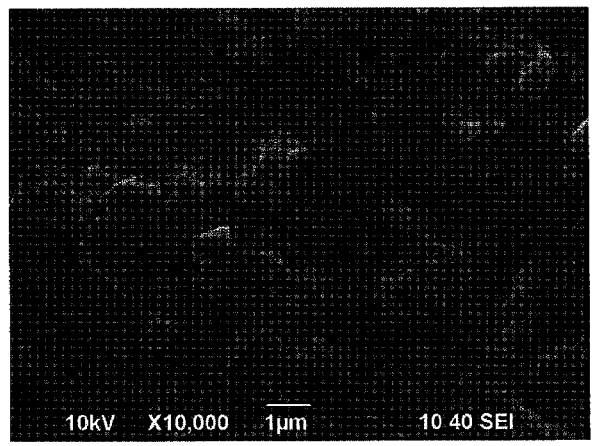
FIG. 4A is a scanning electron micrograph showing ordinary (111)-oriented $Co_3O_4$ particles (comparative example).
Figure 4B:
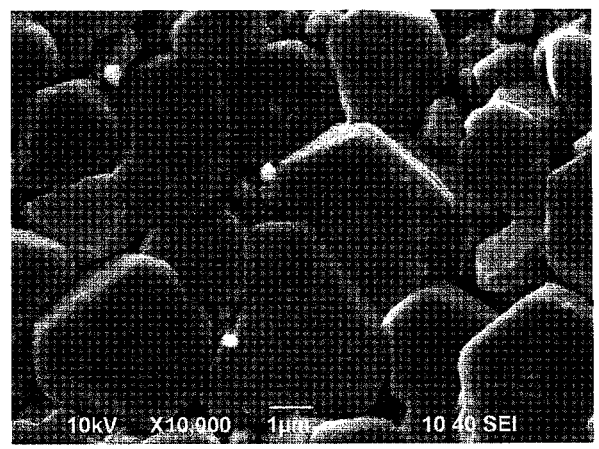
FIG. 4B is a scanning electron micrograph showing $LiCoO_2$ particles of the comparative example yielded through the above-mentioned lithium introduction step being performed on the ordinary $Co_3O_4$ particles (comparative example) shown in FIG. 4A.

Meanwhile, FIG. 4A is a scanning electron micrograph showing an ordinary (111)-oriented $Co_3O_4$ particle (comparative example), the surface energy of the (111) plane being the lowest. FIG. 4B is a scanning electron micrograph showing an $LiCoO_2$ particle of the comparative example yielded through the above-mentioned lithium introduction step being performed on the ordinary $Co_3O_4$ particle (comparative example) shown in FIG. 4A.

Figure 5:
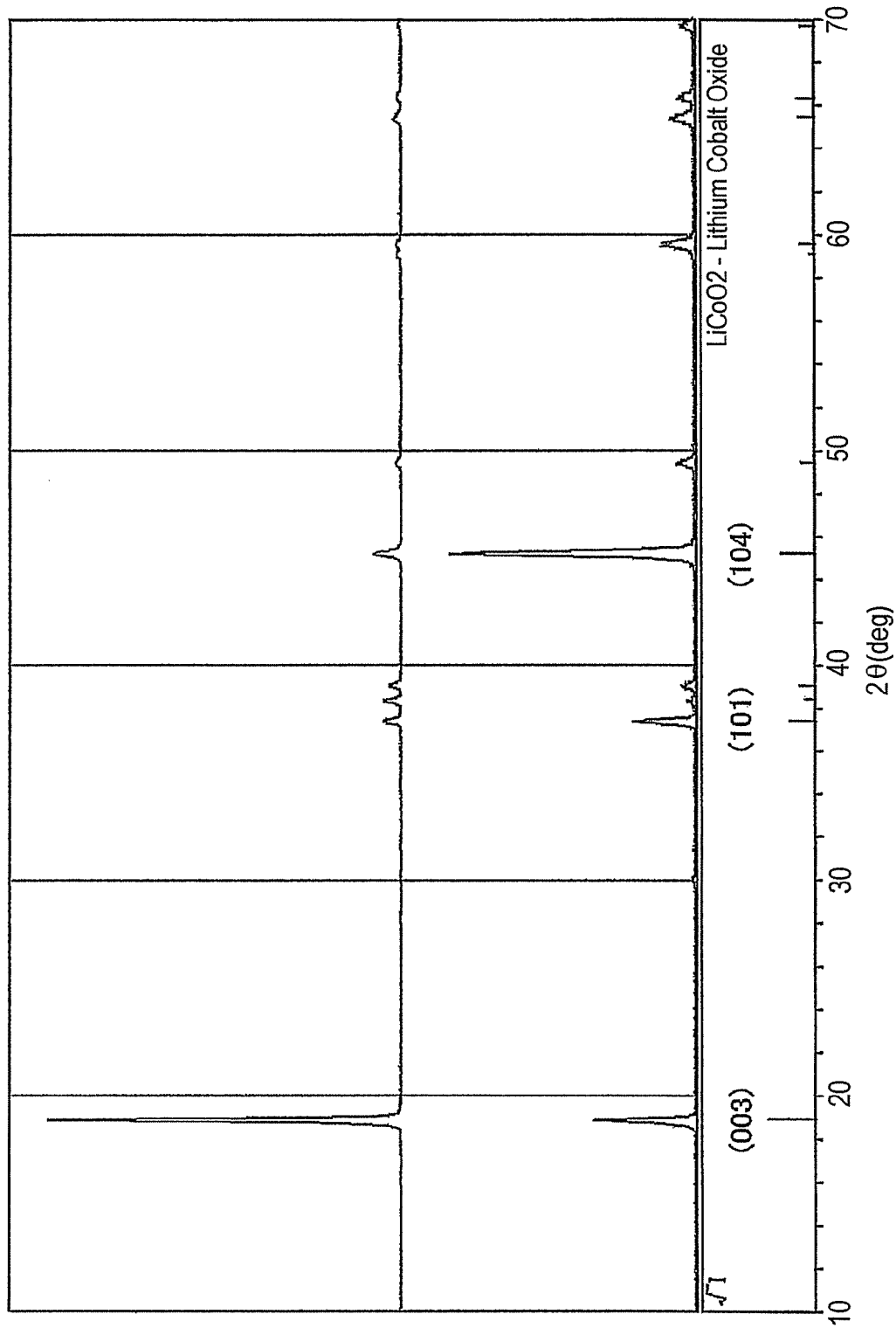
FIG. 5 is a diagram showing X-ray diffraction profiles of the $LiCoO_2$ particles shown in FIGS. 3B and 4B.

FIG. 5 is a diagram showing X-ray diffraction profiles of the $LiCoO_2$ particles shown in FIGS. 3B and 4B (the upper profile corresponds to the comparative example of FIG. 4B, and the lower profile corresponds to the specific example of FIG. 3B). X-ray diffraction measurement will be described later. FIG. 5 shows a profile of diffraction by crystal faces present in parallel with the plate surface of a particle; i.e., crystal faces oriented in a plate surface direction of a particle.

The $Co_3O_4$ particle of the comparative example (see FIG. 4A) apparently shows a (111) orientation. Performing the lithium introduction step on the particle of the comparative example resulted in the (003)-oriented $LiCoO_2$ particle, in which the (003) planes were exposed at the upper surface A and lower surface B (see FIGS. 2C, 4B, and 5; as is apparent from FIG. 4B, the flat (003) planes are exposed at the upper surface (plate surface) A of FIG. 2C at a very high percentage).

By contrast, according to the manufacturing method of the present invention (the above-mentioned specific example), the $Co_3O_4$ particle which is (h00)-oriented, not (111)-oriented, is subjected to the lithium introduction step, thereby yielding the (104)-oriented $LiCoO_2$ particle, in which the (104) planes are exposed at the upper surface (plate surface) A and lower surface (plate surface) B, lithium being readily released from the (104) planes (see FIGS. 2A, 3B, and 5; as is apparent from FIG. 3B, in contrast to FIG. 4B, fine streaks appear on the surface of the particle).

Figure 3D:
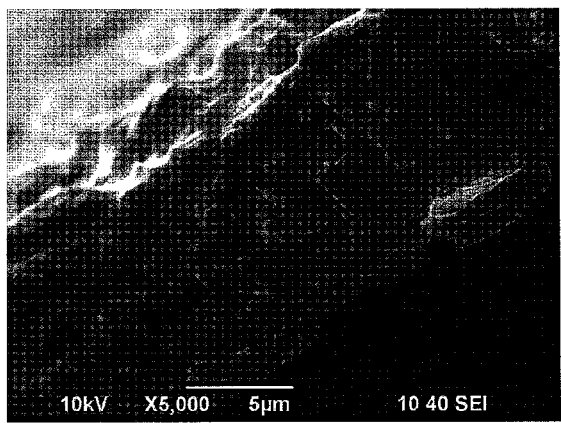
FIG. 3D is a scanning electron micrograph showing the cross section of an $LiCoO_2$ particle yielded (having undergone the lithium introduction step) by the manufacturing method of the present invention.

FIG. 3D is a scanning electron micrograph showing the cross section of a $LiCoO_2$ yielded by a process similar to that of the above-mentioned specific example except for a slurry viscosity of 4,000 cP, a sheet thickness of 10 µm as measured after drying, and a sintering temperature of 1,300° C. As shown in FIG. 3D, the surface and sectional properties of the particle yielded by the method of the present example are similar to those shown in FIG. 3C. Thus, the present example also yielded the (104)-oriented $LiCoO_2$ particle as in the case of the above-mentioned specific example.

Example 2

Manufacturing Method

A slurry having a viscosity of 4,000 cP was prepared from a material and through a method similar to those mentioned above. The thus-prepared slurry was formed into a sheet on a PET film by the doctor blade process such that the thickness of the sheet was 10 µM as measured after drying.

A 70 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 µm; and after sintering and the lowering of temperature were carried out (conditions of the sintering and lowering of temperature will be described later), a portion of the piece which was not fused to the setter was taken out.

An $LiNO_3$ powder (product of Kanto Chemical Co., Inc.) was sprinkled over the thus-yielded $Co_3O_4$ ceramic sheet such that the ratio Li/Co became 1.0. The thus-prepared ceramic sheet was thermally treated within a crucible at 750° C. for 3 hours, thereby yielding an $LiCoO_2$ ceramic sheet (film) having a thickness of 10 µm.

The $LiCoO_2$ ceramic sheet was placed on a polyester mesh having an average opening diameter of 100 µm, and then a spatula was lightly pressed against the ceramic sheet so as to cause the ceramic sheet to pass through the mesh, thereby crushing the ceramic sheet into powdery $LiCoO_2$.

<<Evaluation>>

XRD (X-ray diffraction) measurement was carried out by the following method: a mixture prepared by adding plate-like particles (0.1 g) to ethanol (2 g) was subjected to dispersion for 30 minutes by means of an ultrasonic dispersing device (ultrasonic cleaner); and the resultant dispersion liquid was spin-coated at 2,000 rpm onto a glass substrate measuring 25 mm×50 mm so as to prevent overlap of the plate-like particles to the greatest possible extent and to bring crystal faces in parallel with the glass substrate surface. By means of an XRD apparatus (GEIGER FLEX RAD-IB, product of Rigaku Corp.), the surfaces of the plate-like particles were irradiated with X-ray so as to measure an XRD profile, thereby obtaining the ratio of intensity (peak height) of diffraction by the (003) plane to intensity (peak height) of diffraction by the (104) plane, [003]/[104]. In the above-mentioned method, the plate surface of the plate-like particles are in surface contact with the glass substrate surface, so that the particle plate surface is in parallel with the glass substrate surface. Thus, according to the above-mentioned method, there is obtained a profile of diffraction by crystal faces present in parallel with crystal faces of the particle plate surface; i.e., a profile of diffraction by crystal faces oriented in a plate surface direction of a particle.

In order to evaluate cell characteristics, a cell was fabricated in the following manner.

The yielded $LiCoO_2$ particles, acetylene black, and polyvinylidene fluoride (PVDF) were mixed at a mass ratio of 75:20:5, thereby preparing a positive-electrode material. The prepared positive-electrode material (0.02 g) was compacted to a disk having a diameter of 20 mm under a pressure of 300 kg/cm², thereby yielding a positive electrode.

The yielded positive electrode, a negative electrode formed from a Li metal plate, stainless steel collector plates, and a separator were arranged in the order of collector plate—positive electrode—separator—negative electrode—collector plate. The resultant laminate was filled with an electrolytic solution, thereby yielding a coin cell. The electrolytic solution was prepared as follows: ethylene carbonate (EC) and diethyl carbonate (DEC) were mixed at a volume ratio of 1:1 so as to prepare an organic solvent, and $LiPF_6$ was dissolved in the organic solvent at a concentration of 1 mol/L.

The thus-fabricated coin cell was evaluated for cell capacity (discharge capacity) and capacity retention percentage.

One cycle consists of the following charge and discharge operations: constant-current charge is carried out at 0.1 C rate of current until the cell voltage becomes 4.2 V; subsequently, constant-voltage charge is carried out under a current condition of maintaining the cell voltage at 4.2 V, until the current drops to 1/20, followed by 10 minutes rest; and then, constant-current discharge is carried out at 1 C rate of current until the cell voltage becomes 3.0 V, followed by 10 minutes rest. A total of three cycles were repeated under a condition of 25° C. The discharge capacity in the third cycle was measured.

The fabricated cell was subjected to cyclic charge-discharge at a test temperature of 25° C. The cyclic charge-discharge repeats: (1) charge at 1 C rate of constant current and constant voltage until 4.2 V is reached, and (2) discharge at 1 C rate of constant current until 3.0 V is reached. The capacity retention percentage (%) was defined as a value obtained by dividing the discharge capacity of the cell as measured after 100 charge-discharge cycles by the initial discharge capacity of the cell.

The following Table 1 shows the results of evaluation of seven experimental examples (Comparative Examples 1 and 2 and Experimental Examples 1 to 5) which were rendered different in the degree of orientation by means of changing the amount of addition of $Bi_2O_3$, a sintering condition, and a temperature-lowering condition.

TABLE 1

|  | Bi$_2$O$_3$ additive amount [wt. %] | Sintering temp. [° C.] | Temp. lowering rate [° C./h] | [003]/[104] peak intensity ratio | Discharge capacity [mAh/G] | Capacity retention percentage [%] |
|---|---|---|---|---|---|---|
| Comp. Ex. 1 | 20 | 1100 | 100 | 1.2 | 70 | 97 |
| Exp. Ex. 1 | 20 | 1125 | 100 | 0.9 | 100 | 97 |
| Exp. Ex. 2 | 20 | 1150 | 100 | 0.7 | 115 | 96 |
| Exp. Ex. 3 | 20 | 1200 | 50 | 0.3 | 120 | 95 |
| Exp. Ex. 4 | 20 | 1250 | 50 | 0.07 | 120 | 95 |
| Exp. Ex. 5 | 22.5 | 1300 | 10 | 0.005 | 120 | 91 |
| Comp. Ex. 2 | 22.5 | 1350 | 10 | 0.003 | 120 | 86 |

As shown in Table 1, in the present specific examples, even though the plate-like particle 15b2 for cathode active material has a relatively large particle size, a large discharge capacity (rate characteristic) of 100 mAh/g or greater is realized at a high rate of 1 C.

Also, by virtue of a peak intensity ratio [003]/[104] of 1.0 or less (0.9 or less), deintercalation of Li ions is facilitated, so that the cell capacity (discharge capacity) at high rate is greatly improved. However, at a peak intensity ratio less than 0.005, the capacity retention percentage (cycle characteristic) deteriorates. Conceivably, this is because, when the degree of orientation becomes excessively high (i.e., crystals are oriented to an excessively high degree), a change in the volume of crystal associated with intercalation and deintercalation of Li ions causes the particles to be apt to break (the specifics of the reason for the deterioration in cycle characteristic are not clear).

Effects of the Embodiment

Thus, in the plate-like particle 15b2 for cathode active material; i.e., the plate-like particle of LiCoO$_2$, manufactured by the manufacturing method of the present invention (the above-mentioned specific examples), the (104) planes, through which lithium ions are favorably intercalated and deintercalated, are oriented in the direction of the plate surface of the plate-like particle and are exposed at most of the surface of the plate-like particle. Meanwhile, the (003) planes, through which lithium ions cannot be intercalated and deintercalated, are merely slightly exposed at end surfaces of the plate-like particle (see FIG. 2A). That is, to the electrolyte 13 (including that infiltrating into the binder 15b1), the planes, through which lithium ions are favorably intercalated into and deintercalated, are exposed to a greater extent, whereas the (003) planes, through which lithium ions cannot be intercalated and deintercalated, are exposed to a very small extent. In the example of FIG. 2A, the (003) planes are exposed at the end surface C in the form of a plane. However, other structures can be implemented. For example, there can be formed a structure in which the (003) planes and other planes (the (104) planes, etc.) form a step-like form (see FIG. 3C).

In ordinary LiCoO$_2$ particles (as shown in FIGS. 2B and 2C), reducing the particle size enhances rate characteristic because of an increase in specific surface, but is accompanied by a deterioration in durability due to a deterioration in particle strength, and a reduction in capacity due to an increase in the percentage of a binder. In this manner, in ordinary (conventional) LiCoO$_2$ particles, the rate characteristic is in trade-off relation with durability and capacity.

By contrast, in the LiCoO$_2$ plate-like particles of the present invention, when durability and capacity are enhanced through an increase in particle size, the total area of those planes through which Li ions are readily released also increases, so that high rate characteristic is obtained. Thus, according to the present invention, capacity, durability, and rate characteristic can be enhanced as compared with conventional counterparts.

Particularly, a lithium ion secondary cell for use in mobile equipment, such as cell phones and notebook-style PCs, is required to provide high capacity for long hours of use. For implementation of high capacity, increasing the filling rate of an active material powder is effective, and the use of large particles having a particle size of 10 μm or greater is preferred in view of good filling performance.

In this regard, according to conventional techniques, an attempt to increase the particle size to 10 μm or greater leads to a plate-like particle in which the (003) planes, through which lithium ions and electrons cannot be intercalated and deintercalated, are exposed at a wide portion of the plate surface of the plate-like particle (see FIG. 2C) for the reason of crystal structure, potentially having an adverse effect on charge-discharge characteristics.

By contrast, in the LiCoO$_2$ plate-like particle of the present invention, conductive planes for lithium ions and electrons are widely exposed at the surface of the plate-like particle. Thus, according to the present invention, the particle size of the LiCoO$_2$ plate-like particles can be increased without involvement of adverse effect on charge-discharge characteristics. Therefore, the present invention can provide a positive-electrode material sheet having high capacity and a filling rate higher than that of a conventional counterpart.

The oriented plate-like particle and film have a thickness of preferably 2 μm to 100 μm, more preferably 5 μm to 50 μm, further preferably 5 μm to 20 μm. A thickness in excess of 100 μm is unpreferable in view of deterioration in rate characteristic, and sheet formability. A thickness less than 2 μm is unpreferable in view of the effect of increasing the filling rate being small.

The aspect ratio of the oriented plate-like particle is desirably 4 to 20. At an aspect ratio less than 4, the effect of expanding a lithium ion intercalation/deintercalation surface through orientation becomes small. At an aspect ratio in excess of 20, when the oriented plate-like particles are filled into the cathode sheet such that the plate surfaces of the oriented plate-like particles are in parallel with an in-plane direction of the cathode sheet, a lithium ion diffusion path in the thickness direction of the cathode sheet becomes long, resulting in a deterioration in rate characteristic; thus, the aspect ratio is unpreferable.

<Modifications>

The above-described embodiment and specific examples are, as mentioned above, mere examples of the best mode of the present invention which the applicant of the present invention contemplated at the time of filing the present application. The above-described embodiment and specific examples should not be construed as limiting the invention. Various modifications to the above-described embodiment and specific examples are possible, so long as the invention is not modified in essence.

Several modifications will next be exemplified. In the following description of the modifications, component members similar in structure and function to those of the above-described embodiment are denoted by names and reference numerals similar to those of the above-described embodiment. The description of the component members appearing in the above description of the embodiment can be applied as appropriate, so long as no inconsistencies are involved.

Needless to say, even modifications are not limited to those described below. Limitingly construing the present invention based on the above-described embodiment and the following modifications impairs the interests of an applicant (particularly, an applicant who is motivated to file as quickly as possible under the first-to-file system) while unfairly benefiting imitators, and is thus impermissible.

The structure of the above-described embodiment and the structures of the modifications to be described below are entirely or partially applicable in appropriate combination, so long as no technical inconsistencies are involved.

(1) The present invention is not limited to the structure which is specifically disclosed in the description of the above embodiment.

(1-1) For example, the cathode active material layer 15b shown in FIG. 1B may be a thin film (self-standing-film)-like LiCoO$_2$ ceramic sheet (cathode active material film).

Example 3

Manufacturing Method

An independent thin film (self-standing film)-like LiCoO$_2$ ceramic sheet having a thickness of 10 μm was prepared from a material and through a method similar to those of Example 2 described above. As mentioned above, in the present example, crushing by means of a mesh was not carried out.

<<Evaluation>>

XRD (X-ray diffraction) measurement was carried out by the following method: a self-standing film having a diameter of about 16 mm was placed on a glass substrate such that the film surface was in parallel with the glass substrate surface; and by means of the aforementioned XRD apparatus, the film surface was irradiated with X-ray so as to measure an XRD profile, thereby obtaining the ratio of intensity of diffraction by the (003) plane to intensity of diffraction by the (104) plane, [003]/[104].

In order to evaluate cell characteristics, a cell was fabricated in the following manner.

Au was deposited, by sputtering, on one side of the self-standing film having a diameter of about 16 mm so as to form a current collection layer (thickness: 500 angstroms), thereby yielding a positive electrode. The yielded positive electrode, a negative electrode formed from a Li metal plate, stainless steel collector plates, and a separator were arranged in the order of collector plate—positive electrode—separator—negative electrode—collector plate. The resultant laminate was filled with an electrolytic solution similar to that mentioned above, thereby yielding a coin cell.

The following Table 2 shows the results of evaluation of seven experimental examples (Comparative Examples 3 and 4 and Experimental Examples 6 to 10) which were rendered different in the degree of orientation by means of changing the amount of addition of Bi$_2$O$_3$, a sintering condition, and a temperature-lowering condition.

TABLE 2

|  | Bi$_2$O$_3$ additive amount [wt. %] | Sintering temp. [° C.] | Temp. lowering rate [° C./h] | [003]/[104] peak intensity ratio | Discharge capacity [mAh/G] | Capacity retention percentage [%] |
| --- | --- | --- | --- | --- | --- | --- |
| Comp. Ex. 3 | 20 | 1100 | 100 | 1.2 | 50 | 97 |
| Exp. Ex. 6 | 20 | 1125 | 100 | 0.9 | 90 | 97 |
| Exp. Ex. 7 | 20 | 1150 | 100 | 0.7 | 100 | 97 |
| Exp. Ex. 8 | 20 | 1200 | 50 | 0.3 | 105 | 96 |
| Exp. Ex. 9 | 20 | 1250 | 50 | 0.07 | 110 | 96 |
| Exp. Ex. 10 | 22.5 | 1300 | 10 | 0.005 | 110 | 94 |
| Comp. Ex. 4 | 22.5 | 1350 | 10 | 0.003 | 110 | 88 |

As shown in Table 2, the positive electrodes using the self-standing film-like cathode active material yielded results similar to those appearing in Table 1 mentioned above.

A gel polymer electrolyte can be used.

Example 4

Au was deposited, through sputtering of Au particles, on one side of a self-standing film having a diameter of 16 mm so as to form a current collection layer (thickness: 500 angstroms), thereby yielding a positive electrode. Polyethylene oxide (PEO) was dissolved in an organic electrolytic solution through application of heat; and nonwoven fabric of polypropylene, which serves as a structural reinforcement, was impregnated with the resultant solution, followed by cooling to form a gel electrolyte layer.

The yielded positive electrode, the yielded gel electrolyte layer, a negative electrode formed from a Li metal plate, and stainless steel collector plates were arranged in the order of collector plate—positive electrode—gel electrolyte layer—negative electrode—collector plate. The resultant laminate was filled with the above-mentioned electrolytic solution, thereby yielding a coin cell.

The thus-yielded coin cells were evaluated for cell capacity and capacity retention percentage and exhibited tendencies similar to those of Table 2 mentioned above.

Material used to form the plate-like particle for cathode active material and the cathode active material film of the present invention is not limited to lithium cobaltate, so long as the material has a layered rock salt structure. For example, the plate-like particle for cathode active material and the cathode active material film of the present invention can be formed from a solid solution which contains nickel, manganese, etc., in addition to cobalt. Specific examples of such a solid solution include lithium nickelate, lithium manganate, lithium nickelate manganate, lithium nickelate cobaltate, lithium cobaltate nickelate manganate, and lithium cobaltate manganate. These materials may contain one or more elements of Mg, Al, Si, Ca, Ti, V, Cr, Fe, Cu, Zn, Ga, Ge, Sr, Y, Zr, Nb, Mo, Ag, Sn, Sb, Te, Ba, Bi, etc.

At a temperature of 920° C. or higher, an oxide of Co is phase-transformed from a spinel structure represented by $Co_3O_4$ at room temperature to a rock salt structure represented by CoO. Meanwhile, Mn and Ni assume a spinel structure represented by $Mn_3O_4$ and a rock salt structure represented by NiO, respectively, over a wide range of temperature.

Thus, as in the case of Co, a solid solution which contains at least two of Co, Ni, and Mn can be phase-transformed from a spinel structure at low temperature to a rock salt structure at high temperature through control of composition, temperature, atmosphere, pressure, etc.

In this case, there can be yielded, by the following procedure, an $LiMO_2$ sheet or plate-like particles for cathode active material in which the crystal face, such as (104) and (101), through which lithium ions are favorably intercalated and deintercalated, is oriented in parallel with the plate surface: an independent thin film-like sheet (self-standing sheet) composed of a large number of plate-like $M_3O_4$ (M includes at least one selected from among Co, Ni, and Mn) grains (h00)-oriented in the direction of the plate surface of the grain is formed, and then lithium is introduced into the sheet or pieces obtained by crushing the sheet.

That is, for example, even an Ni—Mn composite oxide, which does not contain Co, assumes a rock salt structure at high temperature and a spinel structure at low temperature as in the case of a Co oxide; thus, the Ni—Mn composite oxide can be used to form an oriented sheet in a manner similar to that mentioned above. By introducing Li into the thus-formed sheet or pieces obtained by crushing the sheet, there can be manufactured a favorably oriented cathode active material represented by $Li(Ni,Mn)O_2$.

Alternatively, there can be yielded, by the following procedure, an $LiMO_2$ sheet or plate-like particles for cathode active material in which the crystal face, such as (104) or (101), through which lithium ions are favorably intercalated and deintercalated, is oriented in parallel with the plate surface: an independent film-like sheet composed of a large number of (h00)-oriented plate-like MO (M includes at least one selected from among Co, Ni, and Mn) grains having a rock salt structure is formed, and then lithium is introduced into the sheet or pieces obtained by crushing the sheet.

Alternatively, an $LiMO_2$ sheet or plate-like particles for cathode active material in which the crystal face, such as (104) and (101), through which lithium ions are favorably intercalated and deintercalated, is oriented in parallel with the plate surface, can be yielded directly by means of controlling composition, temperature, atmosphere, pressure, additive, etc. when a film-like sheet composed of $LiMO_2$ (M includes at least one selected from among Co, Ni, and Mn) particles is sintered.

Also, in a cathode active material having an olivine structure as typified by $LiFePO_4$, b-axis direction ([010] direction) is regarded as the direction of lithium ion conduction. Thus, by means of forming plate-like particles or a film in which ac plane (e.g., the (010) plane) is oriented in parallel with the plate surface, a cathode active material having good performance can be yielded.

Another Example Composition 1

Cobalt-Nickel System

There is formed a green sheet which has a thickness of 20 µm or less and contains an NiO powder, a $Co_3O_4$ powder, and $Al_2O_3$ powder. The green sheet is atmospherically-sintered at a temperature which falls within a range of 1,000° C. to 1,400° C. for a predetermined time, thereby yielding an independent film-like sheet composed of a large number of (h00)-oriented plate-like (Ni,Co,Al)O grains. By means of adding additives, such as $MnO_2$ and ZnO, grain growth is accelerated, resulting in enhancement of (h00) orientation of plate-like crystal grains.

The (h00)-oriented (Ni,Co,Al)O ceramic sheet yielded in the above-mentioned process and lithium nitrate ($LiNO_3$) are mixed, followed by heating for a predetermined time, whereby lithium is introduced into the (Ni,Co,Al)O grains. Thus is yielded a (104)-oriented Li $(Ni_{0.75}Co_{0.2}Al_{0.05})O_2$ plate-like sheet for cathode active material.

Example 5

Preparation of Slurry

First, a slurry was prepared by the following method.

An NiO powder (particle size: 1 µm to 10 µm; product of Seido Chemical Industry Co., Ltd.) (75.1 parts by weight), a $Co_3O_4$ powder (particle size: 1 µm to 5 µm; product of Seido Chemical Industry Co., Ltd.) (21.5 parts by weight), and an $Al_2O_3$ powder (particle size: 1 µm to 10 µm; product of Showa Denko K.K.) (3.4 parts by weight) were mixed and pulverized, followed by heat treatment at 1,300° C. in the atmosphere for five hours. Thus was synthesized an (Ni,Co,Al)O powder.

The powder was milled in a pot mill for 16 hours, thereby yielding (Ni,Co,Al)O material particles (particle size: 0.3 µm). The material particles (100 parts by weight), a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: Di (2-ethylhexyl)phthalate; product of Kurogane Kasei Co., Ltd.) (4 parts by weight), and a dispersant (product name RHEODOL SP-O30, product of Kao Corp.) (2 parts by weight) were mixed. The resultant mixture was stirred under reduced pressure for defoaming and was prepared to a viscosity of 3,000 cP to 4,000 cP.

<<Formation of Tape>>

The thus-prepared slurry was formed into a sheet on a PET film by the doctor blade process such that the thickness of the sheet was 8 µm as measured after drying.

<<Sintering>>

A 50 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 µm, followed by heat treatment at 1,300° C. in air for 10 hours; the atmosphere of the sintering furnace was changed to an oxygen atmosphere, the temperature was lowered to room temperature at a rate of 200° C./h; and a portion of the piece which was not fused to the setter was taken out.

<<Lithium Introduction>>

The thus-yielded (Ni,Co,Al)O ceramic sheet and an $LiNO_3$ powder (product of Kanto Chemical Co., Inc.) were mixed at a mol ratio Li/(NiCoAl) of 1.5. The resultant mixture was heat-treated at 750° C. in an oxygen atmosphere (0.1 MPa) for five hours, thereby yielding an Li (Ni,Co,Al)$O_2$ sheet. The sheet surface was subjected to XRD measurement (evaluation of orientation); as a result, the [003]/[104] ratio was found to be 0.4.

<<Evaluation>>

Tables 3 and 4 show the results of evaluation of various experimental examples which were rendered different in the degree of orientation by changing the conditions of heat treatment (sheet sintering) and lithium introduction as employed in Example 5. In the tables, Experimental Example 14 coincides with Example 5 described above. Cell characteristics were evaluated with respect to a state of powder (the evaluation method is similar to that of Example 2 described above) and a state of self-standing film (the evaluation method is similar to that of Example 3 described above).

TABLE 3

| | Sheet sintering conditions | | Lithium introduction conditions | | |
|---|---|---|---|---|---|
| | Temp. [° C.] | Time [h] | Temp. [° C.] | Time [h] | Oxygen partial pressure [MPa] |
| Comp. Ex. 5 | 1150 | 5 | 750 | 10 | 0.1 |
| Exp. Ex. 11 | 1300 | 5 | 750 | 10 | 0.1 |
| Exp. Ex. 12 | 1300 | 10 | 800 | 10 | 0.1 |
| Exp. Ex. 13 | 1300 | 10 | 750 | 10 | 0.1 |
| Exp. Ex. 14 | 1300 | 10 | 750 | 5 | 0.1 |
| Exp. Ex. 15 | 1300 | 20 | 750 | 5 | 0.2 |
| Exp. Ex. 16 | 1300 | 20 | 750 | 5 | 0.4 |
| Comp. Ex. 6 | 1300 | 20 | 750 | 5 | 0.6 |

TABLE 4

| | [003]/[104] Peak intensity ratio | Plate-like particle | | Active material film | |
|---|---|---|---|---|---|
| | | Discharge capacity [mAh/g] | Capacity retention percentage [%] | Discharge capacity [mAh/g] | Capacity retention percentage [%] |
| Comp. Ex. 5 | 1.8 | 105 | 95 | 80 | 96 |
| Exp. Ex. 11 | 1 | 125 | 95 | 100 | 96 |
| Exp. Ex. 12 | 0.8 | 130 | 94 | 105 | 96 |
| Exp. Ex. 13 | 0.6 | 145 | 94 | 120 | 95 |
| Exp. Ex. 14 | 0.4 | 150 | 94 | 130 | 95 |
| Exp. Ex. 15 | 0.1 | 150 | 93 | 130 | 92 |
| Exp. Ex. 16 | 0.005 | 150 | 90 | 135 | 92 |
| Comp. Ex. 6 | 0.003 | 150 | 85 | 135 | 86 |

As shown in Table 4, in Comparative Example 5, in which the ratio [003]/[104] was in excess of 1.0, the discharge capacity lowered. In Comparative Example 6, in which the ratio [003]/[104] is less than 0.005, the capacity retention percentage lowered. In Experimental Examples 11 to 16, in which the ratio [003]/[104] falls within a range of 0.005 to 1.0, good discharge capacity and capacity retention percentage were exhibited.

In the above-mentioned examples, a portion of nickel in a cobalt-nickel system is substituted with aluminum. However, the present invention is not limited thereto. Needless to say, the present invention can also be favorably applied to Li(Ni, Co)O$_2$.

Another Composition Example 2

Cobalt-Nickel-Manganese 3-Element System

There is formed, by the following method, an independent film-like sheet composed of grains oriented such that the (101) or (104) planes are in parallel with the plate surface of grain: a green sheet having a thickness of 100 μm or less is formed by use of an Li(Ni$_{1/3}$Mn$_{1/3}$Co$_{1/3}$)O$_2$ powder, and the green sheet is sintered at a temperature falling within a range of 900° C. to 1,200° C. for a predetermined time.

The specifics of reason why the process yields oriented grains are not clear. However, an assumed reason is as follows. When the green sheet is sintered, only those particles whose crystal faces having the lowest crystal strain energy are present within the plane of the green sheet selectively undergo in-plane flat (plate-like) grain growth. As a result, there is yielded plate-like crystal grains of Li(Ni$_{1/3}$Mn$_{1/3}$Co$_{1/3}$)O$_2$ which have high aspect ratio and in which particular crystal faces (herein, the (101) and (104) planes) are oriented in parallel with the plate surface.

Herein, the strain energy refers to internal stress in the course of grain growth and stress associated with defect or the like. A layer compound is generally known to have high strain energy.

Both of strain energy and surface energy contribute to selective grain growth (preferred orientation) of grains oriented in a particular direction. The (003) plane is most stable with respect to surface energy, whereas the (101) and (104) planes are stable with respect to strain energy.

At a film thickness of 0.1 μm or less, the ratio of surface to sheet volume is high; thus, selective growth is subjected to surface energy, thereby yielding (003)-plane-oriented grains. Meanwhile, at a film thickness of 0.1 μm or greater, the ratio of surface to sheet volume lowers; thus, selective growth is subjected to strain energy, thereby yielding (101)-plane- and (104)-plane-oriented grains. However, a sheet having a film thickness of 100 μm or greater encounters difficulty in densification. Thus, internal stress is not accumulated in the course of grain growth, so that selective orientation is not confirmed.

At a temperature of 1,000° C. or higher, at which grain growth is accelerated, the present material suffers volatilization of lithium and decomposition due to structural instability. Thus, it is important, for example, to excessively increase the lithium content of material for making compensation for volatilizing lithium, to control atmosphere (for example, in sintering within a closed container which contains a lithium compound, such as lithium carbonate) for restraining decomposition, and to perform low-temperature sintering through addition of additives, such as Bi$_2$O$_3$ and low-melting-point glass.

The film-like sheet yielded in the above-mentioned sheet formation step is in such a state that the sheet is apt to break at grain boundaries. Thus, the film-like sheet yielded in the above-mentioned sheet formation step is placed on a mesh having a predetermined mesh size, and then a spatula is pressed against the sheet from above, whereby the sheet is crushed into a large number of Li(Ni$_{1/3}$Mn$_{1/3}$Co$_{1/3}$)O$_2$ particles.

Alternatively, plate-like crystal grains of Li(Ni$_{1/3}$Mn$_{1/3}$Co$_{1/3}$)O$_2$ can also be yielded by the following manufacturing method.

There is formed a green sheet which has a thickness of 20 μm or less and contains an NiO powder, an MnCO$_3$ powder, and a Co$_3$O$_4$ powder. The green sheet is sintered in an Ar atmosphere at a temperature which falls within a range of 900° C. to 1,300° C. for a predetermined time, thereby yielding an independent film-like sheet composed of a large number of (h00)-oriented plate-like (Ni,Mn,Co)$_3$O$_4$ grains. In the course of the sintering, (Ni,Mn,Co)$_3$O$_4$ having a spinel structure is phase-transformed to (Ni,Mn,Co)O having a rock salt structure through reduction.

At this time, only those particles whose crystal faces having the lowest surface energy are present within the plane of the green sheet selectively undergo in-plane flat (plate-like)

grain growth. As a result, sintering the sheet yields plate-like crystal grains of (Ni,Mn,Co)O which have high aspect ratio and in which particular crystal faces (herein, the (h00) planes) are oriented in parallel with the plate surface of the grain.

In the process of temperature lowering, through replacement of the atmosphere within the furnace with an oxygen atmosphere, (Ni,Mn,Co)O is oxidized into $(Ni,Mn,Co)_3O_4$. At this time, the orientation of (Ni,Mn,Co)O is transferred, thereby yielding plate-like crystal grains of $(Ni,Mn,Co)_3O_4$ in which particular crystal faces (herein, the (h00) planes) are oriented in parallel with the plate surface of the grain.

In the oxidation from (Ni,Mn,Co)O to $(Ni,Mn,Co)_3O_4$, the degree of orientation is apt to deteriorate for the following reason: since (Ni,Mn,Co)O and $(Ni,Mn,Co)_3O_4$ differ greatly in crystal structure and Ni—O, Mn—O, and Co—O interatomic distances, oxidation (i.e., insertion of oxygen atoms) is apt to be accompanied by a disturbance of crystal structure.

Thus, preferably, conditions are selected as appropriate so as to avoid deterioration in the degree of orientation to the greatest possible extent. For example, reducing the temperature-lowering rate, holding at a predetermined temperature, and reducing the partial pressure of oxygen are preferred.

The film-like sheet yielded in the above-mentioned sheet formation step is in such a state that the sheet is apt to break at grain boundaries. Thus, the film-like sheet yielded in the above-mentioned sheet formation step is placed on a mesh having a predetermined mesh size, and then a spatula is pressed against the sheet from above, whereby the sheet is crushed into a large number of $(Ni,Mn,Co)_3O_4$ particles.

The (h00)-oriented $(Ni,Mn,Co)_3O_4$ particles yielded in the above-mentioned crushing step and $Li_2CO_3$ are mixed. The resultant mixture is heated for a predetermined time, whereby lithium is intercalated into the $(Ni,Mn,Co)_3O_4$ particles. Thus, there is yielded (104)-oriented $Li(Ni_{1/3}Mn_{1/3}Co_{1/3})O_2$; i.e., the plate-like particles 15b2 for cathode active material.

Example 6

Preparation of Slurry

First, a slurry was prepared by the following method.

An NiO powder (particle size: 1 μM to 10 μm; product of Seido Chemical Industry Co., Ltd.) (24.4 parts by weight), an $MnCO_3$ powder (particle size: 1 μm to 10 μm; product of Tosoh Corp.) (28.4 parts by weight), a $Co_3O_4$ powder (particle size: 1 μm to 5 μm; product of Seido Chemical Industry Co., Ltd.) (26.2 parts by weight), and an $Li_2CO_3$ powder (particle size: 10 μm to 50 μm; product of Kanto Chemical Co., Inc.) (21.0 parts by weight) were mixed and pulverized so as to attain a composition of $Li_{1.20}(Ni_{1/3}Mn_{1/3}Co_{1/3})O_2$. The resultant powder mixture in a closed sheath was heat-treated at 720° C. for 24 hours in the atmosphere. Thus was synthesized an $Li_{1.20}(Ni_{1/3}Mn_{1/3}Co_{1/3})O_2$ powder.

The powder was milled in a pot mill for 5 hours, thereby yielding $Li(Ni_{1/3}Mn_{1/3}Co_{1/3})O_2$ material particles (particle size: 0.3 μm). The material particles (100 parts by weight), a dispersion medium (toluene:isopropanol=1:1) (100 parts by weight), a binder (polyvinyl butyral: product No. BM-2; product of Sekisui Chemical Co. Ltd.) (10 parts by weight), a plasticizer (DOP: Di(2-ethylhexyl)phthalate; product of Kurogane Kasei Co., Ltd.) (4 parts by weight), and a dispersant (product name RHEODOL SP-O30, product of Kao Corp.) (2 parts by weight) were mixed. The resultant mixture was stirred under reduced pressure for defoaming and was prepared to a viscosity of 3,000 cP to 4,000 cP.

<<Formation of Tape>>

The thus-prepared slurry was formed into a sheet on a PET film by the doctor blade process such that the thickness of the sheet was 16 μm as measured after drying.

<<Sintering>>

A 30 mm square piece was cut out from the sheet-like compact separated from the PET film by means of a cutter; the piece was placed at the center of a setter (dimensions: 90 mm square×1 mm high) made of zirconia and embossed in such a manner as to have a protrusion size of 300 μm. The setter was placed in a sheath in which an $Li_2CO_3$ powder (1 g) was placed. The sheath closed with a cover was subjected to sintering at 1,120° C. for 10 hours. Then, a portion of the piece which was not fused to the setter was taken out.

The ceramic sheet yielded through sintering was placed on a mesh having an opening diameter of 100 μm, and then a spatula was lightly pressed against the ceramic sheet so as to cause the ceramic sheet to pass through the mesh, thereby crushing the ceramic sheet into a powder. The yielded powder was analyzed for components by means of ICP (inductively coupled plasma) emission spectrophotometer (product name ULTIMA2, product of HORIBA Ltd.) and was found to be of $Li_{1.05}(Ni_{1/3}Mn_{1/3}Co_{1/3})O_2$. The yielded powder was subjected to XRD measurement and was found to have a ratio [003]/[104] of 0.4.

<<Evaluation>>

Tables 5 and 6 show the results of evaluation of various experimental examples which were rendered different in the degree of orientation by changing the conditions of heat treatment (sheet sintering), etc. as employed in Example 6. In the tables, Experimental Example 20 coincides with Example 6 described above. In Comparative Example 7 and Experimental Examples 17 and 18, $Bi_2O_3$ (particle size: 0.3 μm; product of Taiyo Koko Co., Ltd.) was added in preparation of slurry.

TABLE 5

| | $Bi_2O_3$ additive | Sheet sintering conditions | | |
|---|---|---|---|---|
| | amount[wt. %] | Temp.[° C.] | Time[h] | Atmosphere |
| Comp. Ex. 7 | 0.5 | 1050 | 1 | Air |
| Exp. Ex. 17 | 0.2 | 1070 | 5 | Air |
| Exp. Ex. 18 | 0.1 | 1090 | 10 | Air |
| Exp. Ex. 19 | 0 | 1120 | 6 | Air |
| Exp. Ex. 20 | 0 | 1120 | 10 | Air |
| Exp. Ex. 21 | 0 | 1150 | 5 | Oxygen |
| Exp. Ex. 22 | 0 | 1180 | 8 | Oxygen |
| Comp. Ex. 8 | 0 | 1180 | 15 | Oxygen |

TABLE 6

| | [003]/[104] Peak intensity ratio | Plate-like particle | | Active material film | |
|---|---|---|---|---|---|
| | | Discharge capacity [mAh/g] | Capacity retention percentage [%] | Discharge capacity [mAh/g] | Capacity retention percentage [%] |
| Comp. Ex. 7 | 1.4 | 90 | 95 | 70 | 94 |
| Exp. Ex. 17 | 1 | 110 | 95 | 95 | 94 |
| Exp. Ex. 18 | 0.8 | 115 | 94 | 100 | 93 |
| Exp. Ex. 19 | 0.6 | 120 | 94 | 105 | 93 |
| Exp. Ex. 20 | 0.4 | 130 | 94 | 120 | 93 |
| Exp. Ex. 21 | 0.1 | 130 | 93 | 120 | 93 |
| Exp. Ex. 22 | 0.005 | 130 | 90 | 120 | 92 |
| Comp. Ex. 8 | 0.003 | 130 | 85 | 120 | 87 |

As shown in Tables 5 and 6, since sintering at low temperature for a short time with $Bi_2O_3$ added in a relatively large amount leads to abrupt, isotropic grain growth, Comparative Example 7 shows plate-like particles which are dense, but are not oriented. In this case, discharge capacity lowered considerably. Also, in Comparative Example 8 in which the ratio [003]/[104] is less than 0.005, capacity retention percentage lowered. In Experimental Examples 17 to 22 in which the ratio [003]/[104] falls within a range of 0.005 to 1.0, good discharge capacity and capacity retention percentage were exhibited.

Although the ratio Li/Co is not limited to 1.0, it falls preferably within a range of 0.9 to 1.2, more preferably within a range of 1.0 to 1.1. Thus, good charge-discharge characteristics can be realized.

Example 7

Powdery $LiCoO_2$ was manufactured by a method similar to that in Experimental Example 3 except that the ratio Li/Co was 1.2 when sprinkling $LiNO_3$ powder on $Co_3O_4$ ceramic sheet. Extra lithium compound was removed by washing treatment of the resultant powdery $LiCoO_2$. Thereafter, by componental analysis using the above-described ICP emission spectrophotometer, it was revealed that Li/Co=1.1. In addition, an XRD measurement (evaluation of the orientation) showed that X-ray diffraction intensity ratio [003]/[104]=0.3. By contrast, a similar componental analysis of the powdery $LiCoO_2$ manufactured in Experimental Example 3 revealed that Li/Co=1.0.

Example 8

An independent film-like $LiCoO_2$ ceramic sheet (self-standing sheet) with a thickness of 10 μm was manufactured by a method similar to that in Experimental Example 8 except that the ratio Li/Co was 1.2 when sprinkling $LiNO_3$ powder on $Co_3O_4$ ceramic sheet. Extra lithium compound was removed by crushing on a mesh and washing treatment of the resultant film-like $LiCoO_2$ ceramic sheet. Thereafter, by componental analysis using the above-described ICP emission spectrophotometer, it was revealed that Li/Co=1.1. In addition, an XRD measurement (evaluation of the orientation) showed that X-ray diffraction intensity ratio [003]/[104]=0.3. By contrast, a similar componental analysis of the film-like $LiCoO_2$ ceramic sheet manufactured in Experimental Example 8 revealed that Li/Co=1.0.

Example 9

$Li(Ni,Co,Al)O_2$ powder was manufactured by a method similar to that in Experimental Example 14 except that the mole fraction Li/(NiCoAl) was 2.0 when mixing (Ni,Co,Al)O ceramic sheet with $LiNO_3$ powder. Extra lithium compound was removed by washing treatment of the resultant $Li(Ni,Co,Al)O_2$ sheet. Thereafter, by componental analysis using the above-described ICP emission spectrophotometer, it was revealed that Li/(NiCoAl)=1.1. In addition, an XRD measurement (evaluation of the orientation) showed that X-ray diffraction intensity ratio [003]/[104]=0.4. By contrast, a similar componental analysis of the $Li(Ni,Co,Al)O_2$ sheet manufactured in Experimental Example 14 revealed that Li/(NiCoAl)=1.0.

The applications of the plate-like particle for cathode active material of the present invention are not limited to a liquid-type lithium secondary battery, such as the lithium secondary battery 10 shown in FIG. 1A. For example, an inorganic solid, an organic polymer, or a gel formed by impregnating an organic polymer with an electrolytic solution can be used as electrolyte.

Figure 6A:
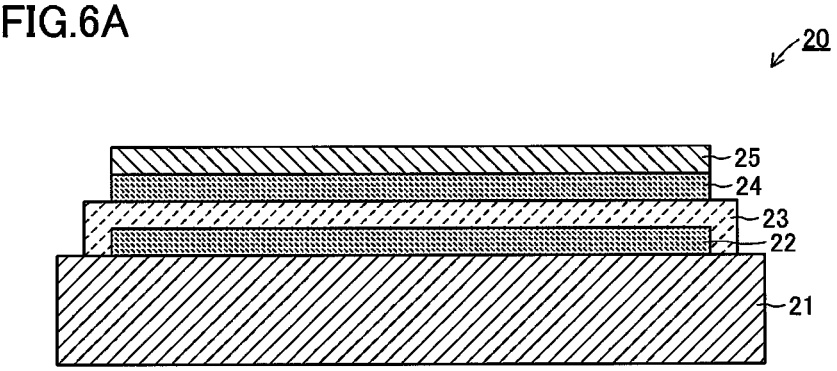
FIG. 6A is a sectional view of the schematic configuration of a lithium secondary battery of a modification.

FIG. 6A is a sectional view of the schematic configuration of a lithium secondary battery 20 of a modification. Referring to FIG. 6A, the lithium secondary battery 20 is of a so-called full solid type and includes a cathode collector 21, a cathode active material layer 22, a solid electrolyte layer 23, an anode active material layer 24, and an anode collector 25. The lithium secondary battery 20 is formed by laminating, on the cathode collector 21, the cathode active material layer 22, the solid electrolyte layer 23, the anode active material layer 24, and the anode collector 25 in this order.

Since the basic configuration of the lithium secondary battery 20 (including materials used to form the cathode collector 21, the solid electrolyte layer 23, the anode active material layer 24, and the anode collector 25) shown in FIG. 6A is well known, detailed description thereof is omitted herein.

Figure 6B:
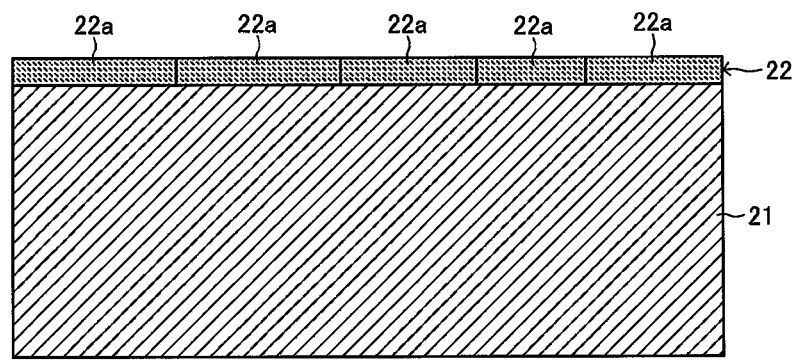
FIG. 6B is an enlarged sectional view of a cathode active material layer shown in FIG. 6A.

FIG. 6B is an enlarged sectional view of the cathode active material layer 22 shown in FIG. 6A. Referring to FIG. 6B, the cathode active material layer 22 is formed such that a large number of plate-like particles 22a for cathode active material are joined together in planar directions to assume a film-like form. Similarly to the above-described embodiment, the plate-like particles 22a for cathode active material also has, a structure in which planes other than the (003) plane (e.g., the (104) plane) are exposed at a surface whose direction of normal is along the thickness direction of the particle (upper and lower surfaces in the drawing)).

In the thus-configured lithium secondary battery 20, the plate-like particles 22a for cathode active material is such that the percentage of exposure (contact) of the (003) planes, through which lithium ions cannot be intercalated and deintercalated, to the solid electrolyte layer 23 is considerably low. That is, unlike a conventional configuration as disclosed in Japanese Patent Application Laid-Open (kokai) No. 2003-132887, in the lithium secondary battery 20 of the present modification, almost all the surface of the cathode active material layer 22 which faces (is in contact with) the solid electrolyte layer 23 is composed of those planes (e.g., the (104) planes) through which lithium ions are favorably intercalated and deintercalated.

Thus, according to the present invention, the full-solid-type lithium secondary battery 20 achieves higher capacity and higher rate characteristic. Further, by increasing the particle size of the plate-like particles 22a for cathode active material, durability is improved, and far higher capacity and far higher rate characteristic are achieved.

In formation of the cathode active material layer 22 of the thus-configured lithium secondary battery 20, the crushing step in the above-described embodiment is not carried out. That is, the $Co_3O_4$ ceramic sheet yielded through sintering of a green sheet is not crushed and is intercalated with lithium.

In the above-described modification, the cathode active material layer 22 is applied to a full-solid-type cell. Nevertheless, the present invention can also be applied to a liquid-type cell. Usually, material for a positive electrode of a liquid-type cell is filled with an active material at a filling rate of about 60%. By contrast, the active material film of the present invention achieves substantially a filling rate of 100% while planes through which lithium ions are intercalated and deintercalated are arrayed over the entire film surface. That is, while the sacrifice of rate characteristic is minimized, a very high capacity is attained.

The cathode active material layer 22 and the cathode collector 21 may be merely in contact with each other at the interface therebetween or may be bonded together by means of a thin layer of an electrically conductive binder, such as acetylene black. In the latter case, bending of the cathode collector 21 may cause cracking in the cathode active material layer 22. Nevertheless, such a crack is in parallel with the direction of conduction of electrons and ions. Thus, the occurrence of cracking does not raise any problem with respect to characteristics.

The surface of the cathode active material layer 22 may be polished to flatness. In this case, in order to remove stress and defect which remain on the polished surface, heat treatment at 1,000° C. or lower may be conducted. The heat treatment improves adhesion between the cathode collector 21 and the solid electrolyte layer 23, and also improves charge-discharge characteristic because of exposure of active crystal faces.

Figure 7:
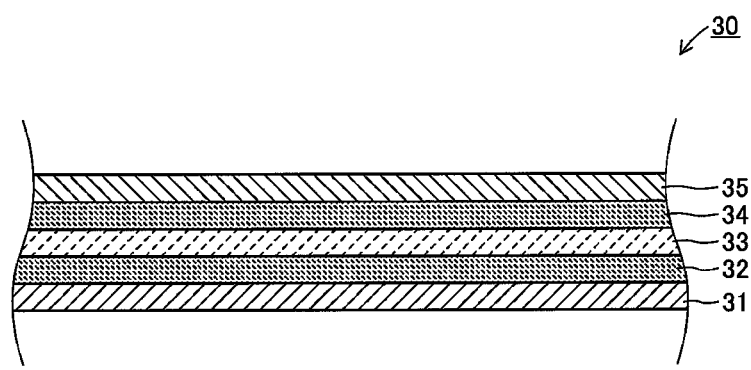
FIG. 7 is a sectional view of the schematic configuration of a lithium secondary battery of another modification.

FIG. 7 is a sectional view of the schematic configuration of a lithium secondary battery 30 of another modification. Referring to FIG. 7, the lithium secondary battery 30 is of a so-called polymer type and includes a cathode collector 31, a cathode active material layer 32, a polymer electrolyte layer 33, an anode active material layer 34, and an anode collector 35. The lithium secondary battery 30 is formed by laminating, on the cathode collector 31, the cathode active material layer 32, the polymer electrolyte layer 33, the anode active material layer 34, and the anode collector 35 in this order.

As compared with a liquid type having the risk of liquid leakage, the polymer-type lithium secondary battery 30 is characterized in that a thin cell configuration is possible. The film-like cathode active material layer 32 of the present invention achieves substantially a filling rate of 100% while planes through which lithium ions are intercalated and deintercalated are arrayed over the entire film surface. That is, as compared with conventional practices, the positive electrode portion can be rendered very thin, and a thinner cell can be implemented.

Figure 8:
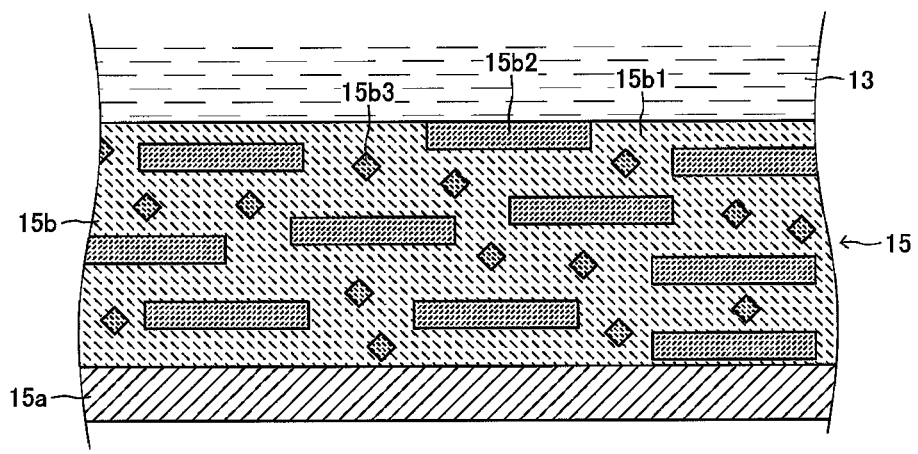
FIG. 8 is a sectional view of the structure of a modification of the positive electrode shown in FIG. 1B.

(1-2) For example, the oriented plate-like particles of the present invention of a plurality of sizes and shapes may be blended as appropriate in the cathode active material layer 15b. As shown in FIG. 8, the oriented plate-like particles 15b2 of the present invention and conventional isometric particles 15b3 may be mixed at an appropriate mixing ratio. For example, by means of mixing, at an appropriate mixing ratio, isometric particles and the oriented plate-like particles having a thickness substantially equivalent to the particle size of the isometric particle, the particles can be efficiently arrayed, whereby the filling rate can be raised.

(2) The present invention is not limited to the manufacturing methods disclosed specifically in the description of the above-described embodiment.

For example, the sintering temperature for the green sheet may be a temperature falling within a range of 900° C. to 1,300° C. Also, the additive used in the sheet formation step is not limited to $Bi_2O_3$.

Further, in place of the material particles of $Co_3O_4$ used in the above-described specific examples, material particles of CoO can be used. In this case, sintering a slurry yields, in a temperature range of 900° C. or higher, a (h00)-oriented CoO sheet having a rock salt structure. Oxidizing the CoO sheet, for example, at about 800° C. or lower yields a sheet composed of (h00)-oriented $Co_3O_4$ particles having a spinel structure, the array of Co atoms and O atoms in CoO being partially transferred to the $Co_3O_4$ particles.

In the lithium introduction step, in place of merely mixing the (h00)-oriented $Co_3O_4$ particles and $Li_2CO_3$, followed by heating for a predetermined time, the (h00)-oriented $Co_3O_4$ particles and $Li_2CO_3$ may be mixed and heated in flux, such as sodium chloride (melting point: 800° C.) or potassium chloride (melting point: 770° C.).

(3) Needless to say, those modifications which are not particularly referred to are also encompassed in the technical scope of the present invention, so long as the invention is not modified in essence.

Those components which partially constitute means for solving the problems to be solved by the present invention and are illustrated with respect to operations and functions encompass not only the specific structures disclosed above in the description of the above embodiment and modifications but also any other structures that can implement the operations and functions. Further, the contents (including specifications and drawings) of the prior application and publications cited herein can be incorporated herein as appropriate by reference.

The invention claimed is:

1. A plate-like particle for a lithium secondary battery cathode active material, the particle having a layered rock salt structure, characterized in that a (003) plane is oriented in a direction intersecting the direction of a plate surface of the particle.

2. A plate-like particle for a lithium secondary battery cathode active material according to claim 1, wherein a plane other than the (003) plane is oriented in the direction of the plate surface.

3. A plate-like particle for a lithium secondary battery cathode active material according to claim 2, wherein a (104) plane is oriented in the direction of the plate surface, and
the particle has a ratio of intensity of diffraction by the (003) plane to intensity of diffraction by the (104) plane, [003]/[104], as obtained by X-ray diffraction falling within a range of 0.005 to 1.0.

4. A cathode active material film for a lithium secondary battery, the cathode active material film having a layered rock salt structure, characterized in that a plane other than a (003) plane is oriented in the direction of a plate surface of the cathode active material film.

5. A cathode active material film for a lithium secondary battery according to claim 4, wherein a (104) plane is oriented in the direction of the plate surface, and
a ratio of intensity of diffraction by the (003) plane to intensity of diffraction by the (104) plane, [003]/[104], as obtained by X-ray diffraction falls within a range of 0.005 to 1.0.

6. A method for manufacturing a cathode active material for a lithium secondary battery, the cathode active material having a layered rock salt structure, characterized by:
forming a thin film-like sheet comprising plate-like $Co_3O_4$ particles which is (h00)-oriented in the direction of the plate surface; and
introducing Li into the $Co_3O_4$ particles.

7. A method for manufacturing a cathode active material for a lithium secondary battery according to claim 6, wherein forming the sheet comprises:
a step of forming a green sheet having a thickness of 20 μm or less which contains $Co_3O_4$ and $Bi_2O_3$; and
a step of sintering the green sheet at a temperature falling within a range of 900° C. to 1,300° C.

8. A method for manufacturing a cathode active material for a lithium secondary battery according to claim 7, further comprising:
a step of crushing the sheet into a large number of the $Co_3O_4$ particles, and
the Li introducing step comprises:
a step of mixing the $Co_3O_4$ particles obtained by the crushing step with $Li_2CO_3$, heating the resultant mixture.

9. A method for manufacturing a cathode active material for a lithium secondary battery according to claim 6, further comprising:
a step of crushing the sheet into a large number of the $Co_3O_4$ particles, and
the Li introducing step comprises:
a step of mixing the $Co_3O_4$ particles obtained by the crushing step with $Li_2CO_3$, heating the resultant mixture.

10. A lithium secondary battery comprising:
a positive electrode which contains a plate-like particle having a layered rock salt structure as a cathode active material, wherein a (003) plane is oriented in a direction intersecting the direction of a plate surface of the particle;
a negative electrode which contains a carbonaceous material or a lithium-occluding material as an anode active material; and
an electrolyte provided so as to intervene between the positive electrode and the negative electrode.

11. A lithium secondary battery according to claim 10, wherein a plane other than the (003) plane is oriented in the direction of the plate surface.

12. A lithium secondary battery according to claim 11, wherein a (104) plane is oriented in the direction of the plate surface, and
the particle has a ratio of intensity of diffraction by the (003) plane to intensity of diffraction by the (104) plane, [003]/[104], as obtained by X-ray diffraction falling within a range of 0.005 to 1.0.

13. A lithium secondary battery comprising:
a positive electrode which includes a cathode active material film having a layered rock salt structure, wherein a plane other than a (003) plane is oriented in the direction of a plate surface of the cathode active material film;
a negative electrode which contains a carbonaceous material or a lithium occluding material as an anode active material; and
an electrolyte provided so as to intervene between the positive electrode and the negative electrode.

14. A lithium secondary battery according to claim 13, wherein a (104) plane is oriented in the direction of the plate surface, and
a ratio of intensity of diffraction by the (003) plane to intensity of diffraction by the (104) plane, [003]/[104], as obtained by X-ray diffraction falls within a range of 0.005 to 1.0.

15. A plate-like particle for a lithium secondary battery cathode active material according to claim 1, wherein the plate-like particle is flat.

16. A plate-like particle for a lithium secondary battery cathode active material according to claim 1, wherein the plate-like particle has a width dimension, w, that is greater than a thickness dimension, t.

17. A plate-like particle for a lithium secondary battery cathode active material according to claim 16, wherein w/t is 4 to 20.

* * * * *